United States Patent
Kalyanasundaram et al.

(10) Patent No.: US 12,388,510 B2
(45) Date of Patent: Aug. 12, 2025

(54) SELECTION OF SET OF ANALOG BEAMFORMING WEIGHTS FOR HYBRID BEAMFORMING WITHIN WIRELESS NETWORKS

(71) Applicant: Nokia Solutions and Networks Oy, Espoo (FI)

(72) Inventors: Suresh Kalyanasundaram, Bangalore (IN); Shalini Gulati, Bangalore (IN); Lorenzo Maggi, Paris (FR)

(73) Assignee: Nokia Solutions and Networks Oy, Espoo (FI)

( * ) Notice: Subject to any disclaimer, the term of this patent is extended or adjusted under 35 U.S.C. 154(b) by 31 days.

(21) Appl. No.: 18/416,195

(22) Filed: Jan. 18, 2024

(65) Prior Publication Data
US 2024/0250735 A1     Jul. 25, 2024

(30) Foreign Application Priority Data
Jan. 25, 2023 (FI) .................................. 20235069

(51) Int. Cl.
*H04L 23/02* (2006.01)
*H04B 7/06* (2006.01)

(52) U.S. Cl.
CPC ......... *H04B 7/0686* (2013.01); *H04B 7/0628* (2013.01)

(58) Field of Classification Search
CPC .... H04B 7/0686; H04B 7/0617; H04B 7/088; H04B 17/24; H04B 7/0408; H04L 5/0048;
(Continued)

(56) References Cited

U.S. PATENT DOCUMENTS 12,273,183 B2 *  4/2025 Duan ................ H04B 7/18554
2016/0345183 A1  11/2016 Hamaliinen et al.
(Continued)

FOREIGN PATENT DOCUMENTS

WO      2015152931 A1   10/2015

OTHER PUBLICATIONS

Extended European Search Report for corresponding European application No. 24151924.8; dated Jul. 15, 2024 (9 pages).
(Continued)

*Primary Examiner* — Khai Tran
(74) *Attorney, Agent, or Firm* — Mendelsohn Dunleavy, P.C.; Steve Mendelsohn

(57) ABSTRACT

A method includes obtaining elevation angle information for a plurality of user devices, wherein the elevation angle information includes, for each of the plurality of user devices, a best or preferred beam elevation angle used or applied by a network node for communication with the user device; estimating an elevation angle distribution for the plurality of user devices based on the collected elevation angle information; determining, based on the elevation angle distribution, a set of analog beamforming weights to be used for hybrid beamforming, wherein each analog beamforming weight of the set of analog beamforming weights is associated with an analog elevation angle; and adjusting the set of analog beamforming weights based on at least one of a set of pre-tilt angle beamforming weights or an estimated (or an estimate of) mechanical downtilt angle.

16 Claims, 12 Drawing Sheets

(58) Field of Classification Search
CPC .............. H04L 5/0069; H04W 72/042; H04W 72/1268
USPC ................................. 375/262, 260, 267, 299
See application file for complete search history.

(56) References Cited

U.S. PATENT DOCUMENTS

| | | | |
|---|---|---|---|
| 2017/0033852 A1 | 2/2017 | Kim et al. | |
| 2018/0076881 A1 | 3/2018 | Zhu et al. | |
| 2019/0296813 A1 | 9/2019 | Wang | |
| 2020/0044704 A1* | 2/2020 | Zhang | H04L 1/0026 |
| 2020/0145078 A1* | 5/2020 | Hong | H04W 16/28 |
| 2020/0274591 A1 | 8/2020 | Kumar et al. | |
| 2022/0052742 A1* | 2/2022 | Huang | H04B 7/0404 |
| 2022/0321185 A1* | 10/2022 | Pepin | H04B 17/12 |

OTHER PUBLICATIONS

Nadeem, Qurrat-Ul-Ain, et al. "Elevation Beamforming with Full Dimension MIMO Architectures in 5G Systems: A Tutorial." arxiv.org, arXiv:1805.00225v4 (2018): 1-37.
Zte, "Initial calibration of 3D channel model and remaining issues of antenna modelling." 3GPP Draft R1-132099. Fukuoka, Japan. May 24, 2013: 1-6.
First Opinion on Patentability and Search Report for corresponding Finnish application No. 20235069; dated Jun. 26, 2023 (9 pages).
Sohrabi, Foad, et al. "Hybrid Analog and Digital Beamforming for mmWave OFDM Large-Scale Antenna Arrays." IEEE Journal on Selected Areas in Communications 35.7 (2017): 1432-1443.
Nam, Junyoung, et al. "Joint Spatial Division and Multiplexing: Opportunistic Beamforming, User Grouping and Simplified Downlink Scheduling." IEEE Journal of Selected Topics in Signal Processing 8.5 (2014): 876-890.

* cited by examiner 430. 1 of 4 possible analog beamforming weights is applied by phase shifter PS1.

Antenna elements 318

Pre-tilt weights 420 (e.g., including amplitude and/or phase) applied to antenna elements here to provide pre-tilt Phase Shifters PS1

$e^{-j\frac{2\pi d}{\lambda}3\sin\theta_a}$

PS1

$e^{j\frac{2\pi d}{\lambda}\sin\theta_{pt}}$ $e^{j\frac{2\pi d}{\lambda}2\sin\theta_{pt}}$ $e^{j\frac{2\pi d}{\lambda}\sin\theta_{pt}}$ $e^{j\frac{2\pi d}{\lambda}2\sin\theta_{pt}}$ 410. Digital Beamforming Weights 310 applied here Pre-IFFT (e.g., applied per PRB)

PS2

$e^{j\frac{2\pi d}{\lambda}\sin\theta_{pt}}$ $e^{j\frac{2\pi d}{\lambda}2\sin\theta_{pt}}$ $e^{+j\frac{2\pi d}{\lambda}3\sin\theta_a}$ $e^{j\frac{2\pi d}{\lambda}\sin\theta_{pt}}$ $e^{j\frac{2\pi d}{\lambda}2\sin\theta_{pt}}$ Phase Shifters PS2

Antenna elements 318

430. 1 of 4 possible analog beamforming weights is applied by phase shifter PS2

FIG. 4

| Constraint (Max(BestBeamPMF)-Min(BestBeamPMF)) | Actual Achieved (Max(BestBeamPMF)-Min(BestBeamPMF)) | MaxObjFunction value | Best Beam Set (Angles, in degrees) | Best Beam Set PMF |
|---|---|---|---|---|
| 0.06 | 0.05 | 8.84 | [2.44, -0.56] [-4.19, -8.22] | [0.27, 0.25] [0.26, 0.22] |
| 0.08 | 0.08 | 8.86 | [2.45, -0.71] [-4.31, -8.51] | [0.27, 0.26] [0.26, 0.21] |
| 0.1 | 0.09 | 8.9 | [2.86, -1.14] [-4.68, -8.74] | [0.28, 0.28] [0.25, 0.19] |
| 0.2 | 0.13 | 8.92 | [3.0, -1.11] [-4.83, -9.09] | [0.27, 0.30] [0.26, 0.17] |
| 0.3 | 0.13 | 8.92 | [3.0, -1.11] [-4.83, -9.09] | [0.27, 0.30] [0.26, 0.17] |

Table 2: Summary of results for the constrained optimization problem for various constraint values

FIG. 11

SELECTION OF SET OF ANALOG BEAMFORMING WEIGHTS FOR HYBRID BEAMFORMING WITHIN WIRELESS NETWORKS

CROSS-REFERENCE TO RELATED APPLICATIONS

This application claims the benefit of the filing date of Finnish patent application no. 20235069 under 35 U.S.C. 119, the teachings of which application are incorporated herein by reference in their entirety.

TECHNICAL FIELD

This description relates to wireless communications in general and to Hybrid beamforming in particular.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology.

E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include obtaining elevation angle information for a plurality of user devices, wherein the elevation angle information includes, for each of the plurality of user devices, a best or preferred beam elevation angle used or applied by a network node for communication with the user device; estimating an elevation angle distribution for the plurality of user devices based on the collected elevation angle information; determining, based on the elevation angle distribution, a set of analog beamforming weights to be used for hybrid beamforming, wherein each analog beamforming weight of the set of analog beamforming weights is associated with an analog elevation angle; and adjusting the set of analog beamforming weights based on at least one of a set of pre-tilt angle beamforming weights or an estimated mechanical downtilt angle.

According to an example embodiment, an apparatus includes at least one processor, and at least one memory including computer program code, the at least one memory and the computer program code configured to, with the at least one processor, cause the apparatus at least to obtain elevation angle information for a plurality of user devices, wherein the elevation angle information includes, for each of the plurality of user devices, a best or preferred beam elevation angle used or applied by a network node for communication with the user device; estimating an elevation angle distribution for the plurality of user devices based on the collected elevation angle information; determine, based on the elevation angle distribution, a set of analog beamforming weights to be used for hybrid beamforming, wherein each analog beamforming weight of the set of analog beamforming weights is associated with an analog elevation angle; and adjust the set of analog beamforming weights based on at least one of a set of pre-tilt angle beamforming weights or an estimated mechanical downtilt angle.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

BRIEF DESCRIPTION OF THE DRAWINGS

FIG. 4 is a diagram illustrating further details of wireless transceivers of FIG. 3.

FIG. 11 is a diagram illustrating a Table 2, which illustrates summary results for constrained optimization of a set of best beams according to an illustrative example.

DETAILED DESCRIPTION

Figure 1:
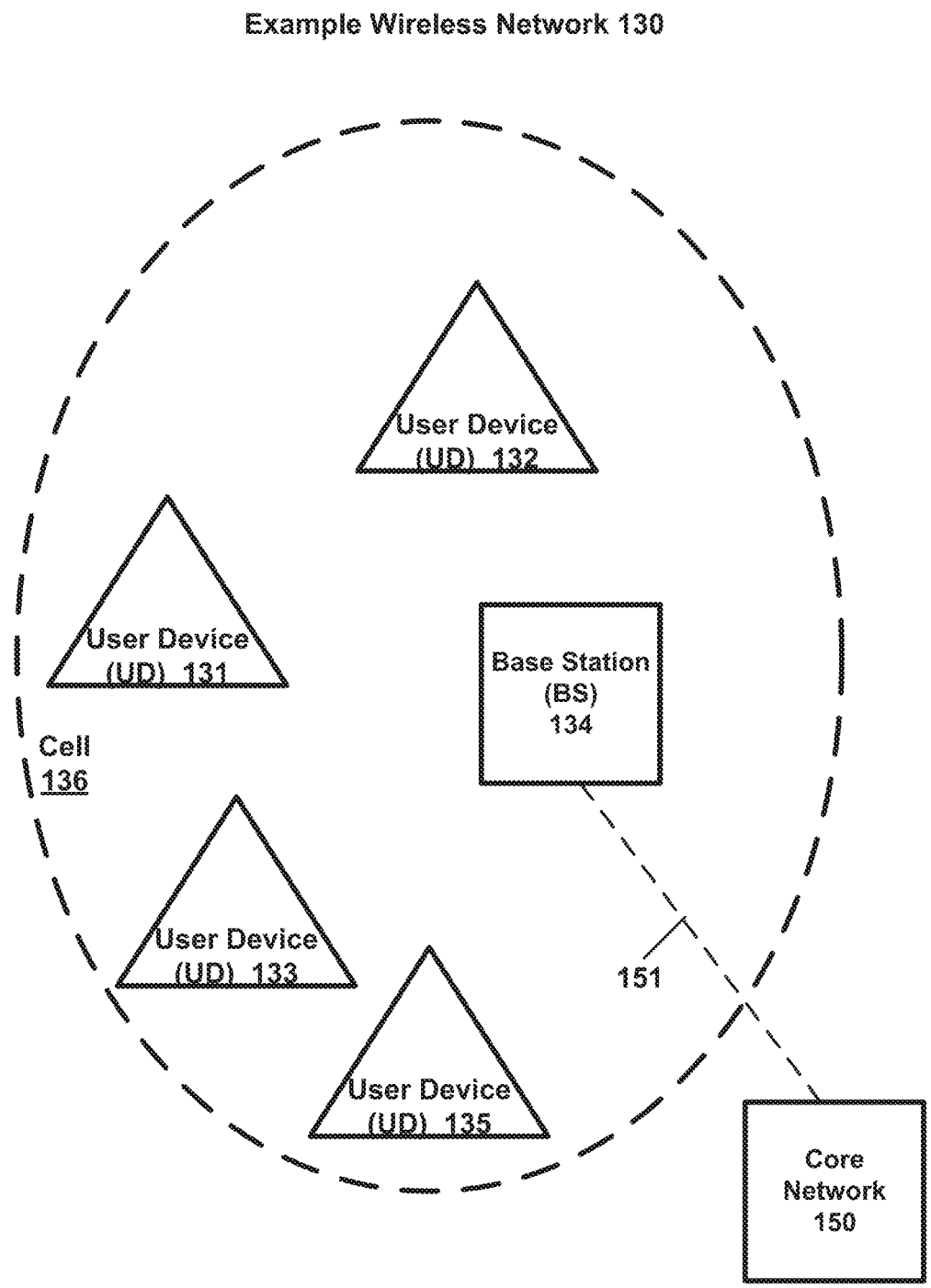
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device or user node (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. Also, a user node may include a user equipment (UE), a user device, a user terminal, a mobile terminal, a mobile station, a mobile node, a subscriber device, a subscriber node, a subscriber terminal, or other user node. For example, a user node may be used for wireless communications with one or more network nodes (e.g., gNB, eNB, BS, AP, CU, DU, CU/DU) and/or with one or more other user nodes, regardless of the technology or radio access technology (RAT). In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The techniques described herein may be applied to a wide variety of wireless technologies or wireless networks, such as 5G (New Radio (NR)), cmWave, and/or mmWave band networks, IoT, MTC, eMTC, eMBB, URLLC, 6G, etc., or any other wireless network or wireless technology. These example networks, technologies or data service types are provided only as illustrative examples.

Beamforming may be used for transmitting and/or receiving a signal. By adjusting a weight (e.g., amplitude and/or phase) of each antenna element of an antenna panel or antenna system, a node (e.g., network node and/or UE) may provide directivity in which transmission power may be directed in a specific direction via beamforming, for transmitting a signal. Thus, beamforming may allow a node to provide transmitter-side directivity, where a transmitting node (e.g., a gNB or network node, or a UE or user device) may apply a weight or a set of weights to antenna elements to form a beam for transmitting a signal. Likewise, beamforming may also be used to provide receiver-side directivity, where a receiving node may apply a weight or set of weights to antenna elements to form a receive beam. Because each beam may typically cover only a limited area or direction, multiple beams (e.g., with each beam pointed in a different direction) are typically required to cover a full range of directions. Example beams may include synchronization signal block reference signal (SSB) beams, and channel state information reference signal (CSI-RS) beams, where each reference signal is associated with a different beam, as it may point in a different direction. A gNB or network node may utilize multiple beams to cover the entire service area, and one or a subset of those beams may be associated with a UE (e.g., may point in a direction towards the UE and/or may be a strongest beam (or best beam, such as the beam having a highest RSRP measurement) for communication with the UE).

Wide beams may be wider (have a wider or larger angle, to cover a larger range of angular directions) than narrow beams. Wide beams may include, e.g., SSB beams or CSI-RS beams, while narrow beams may typically include CSI-RS beams, physical downlink shared channel (PDSCH) beams, of other beams.

3GPP beam management may include procedures P1, P2 and P3 that are briefly summarized as follows:

P1 (gNB wide beam sweeping): The gNB sweeps through a set of wide angular beams assigned to different SSB/CSI-RS resources, while transmitting a signal (e.g., a SSB or a CSI-RS signal) on an associated resource of each beam.

Sweeping may refer to the node generating a sequence of beams (e.g., the gNB transmitting a reference signal via each beam) across a range of beams or directions or possibly covering all directions. The UE may perform signal measurement (e.g., the UE may measure a reference signal receive power (RSRP)) on each of the different SSBs (or for different SSB beams), the UE requests access to the gNB, by transmitting (e.g., by transmitting a random access preamble) in a time-frequency location that corresponds to the best SSB beam.

P2 (gNB narrow beam sweeping): The gNB performs beam sweeping through a set of narrow beams assigned to different CSI-RS resources that cover the wide angular space of the SSB beam adopted (or indicated by the UE as the best wide beam) in P1. The UE performs signal measurement (e.g., measures RSRP of signals transmitted by gNB via the narrow beams) and reports to the gNB the RSRP measurements of one or more of the best or strongest gNB (or network node) transmit narrow beams using a CSI-report. The gNB may select the best gNB transmit narrow beam based on the RSRP measurements.

P3 (UE beam sweeping): the gNB uses the optimal or best gNB transmit narrow beam selected from P2 to transmit multiple CSI-RSs (multiple narrow or CSI-RS beams) while the UE sweeps through a set of UE receive narrow beams to refine the UE beam direction. The UE can make a selection of the best UE receive narrow beam based on the RSRP measurements and communicate the results to gNB.

Therefore, for example, during data transmission, the gNB (or network node) may use the best or strongest (e.g., a beam or reference signal having a highest RSRP) narrow beam found in P2, while the UE may use the best or strongest (e.g., beam or reference signal having a highest RSRP) beam found in P3. These are some example beam management procedures, and others may be used.

In analog beamforming, an amplitude/phase weight is applied to an analog signal at a transmitter or transmit end (e.g., including where the weight may be applied to a phase shifter at the transmitter to adjust a phase of an analog signal, prior to the phase-shifted analog signal being applied to an antenna element(s)). At the receive end (or at the receiver), the signals from different antennas are summed up before the ADC (analog to digital conversion) conversion in analog beamforming. For example, $W_k = a_k * e^{j \sin(\theta\_k)}$, may represent a complex weight for (or applied to the signal to be applied or output to) the $k^{th}$ antenna (or $K^{th}$ antenna element) in the antenna array. $a_k$ is an amplitude of the analog weight, which is typically equal to 1 for analog phase shifters. $\theta_k$ is a phase shift of the analog weight, which may be applied to a phase shifter. Weights (analog beamforming weights) are applied to analog signals in analog beamforming (e.g., after a digital to analog conversion). In practice, the analog beamforming weights are applied to one or more phase shifters at the transmitter to perform analog beamforming at the transmitters. Analog beamforming weights may similarly be applied at a receiver to receive a signal.

In digital beamforming, an amplitude/phase weight (Wk) (or a digital beamforming weight) is applied to a digital signal before a Fast Fourier Transform and/or before signal conversion from digital to analog. At the receiver, the received signals from antennas are first passed from ADC converters and digital down converters before summation operation. For example, $s(t) = x(t) + j*y(t)$, where, $s(t)$ is a complex baseband signal, x(t) is i(t), which is the real part (I), while y(t) is the imaginary part (Q), and j=SQRT(−1). Complex weights are applied to baseband signals (s(t)) in digital beamforming.

Hybrid beamforming utilizes both analog beamforming and digital beamforming. Thus, for example, in hybrid beamforming, both digital beamforming weight(s) and analog beamforming weight(s) may be applied by a transmitter to a signal that is then transmitted via an antenna system.

Hybrid beamforming architecture may provide a cost-effective, low power method of improving the beamforming gain (and thus, improve received signal strength and/or signal to interference plus noise ratio (SINR) at the receiver), e.g., without scaling or increasing the number of digital transmitter/receivers (digital transceivers). A beam (e.g., such as a best beam for a UE, which may have a highest signal strength or RSRP for the UE) may have (or may be associated with) both an elevation (or vertical) angle and an azimuth (or horizontal) angle. Likewise, the weights applied to phase shifters for analog beamforming may adjust one or both of the elevation angle and/or azimuth angle of the transmit beam.

Phase shifters may be used for analog beamforming, e.g., wherein a phase or phase information of an analog weight may be input to the phase shifter to change or shift a phase of an analog signal. Thus, for example, in some cases, phase shifters may be used to increase degrees of freedom to set beamforming weights in the elevation or vertical direction, without decreasing a number of transceivers (transmitter/receivers) in the horizontal (or azimuth) direction. However, one constraint may be that only a limited number (e.g., four) of possible analog beamforming weights (or a limited number of different phases or phase values of the analog weights) may be used or may be possible, at least in some cases. Furthermore, analog phase shifters, being analog in nature, will typically apply the analog phase (or analog beamforming weight) to the analog signal after an Inverse Fast Fourier Transform (FFT), and thus, at least in some cases, the same analog beamforming weight(s) may need to be applied to all or a group of physical resource blocks ((PRBs), wherein each PRB may include a set of subcarriers across a set of one or more symbols or time resources) of a particular slot (or for each slot). Thus, in some cases, the set of analog beamforming weights, e.g., a set of N (e.g., N=4 in an illustrative example) phase shift values, wherein one of the N phase shift values may be selected to be applied for analog beamforming) that can be applied to a phase shifter for analog beamforming may, at least in some cases, need to be determined or set in advance, such as at manufacturing time of a network node or gNB. Thus, for example, the set of possible phase shift values (or analog beamforming weights) that may be applied to a phase shifter(s) may need to be determined or set in advance, e.g., such as at or before manufacturing time for a gNB, or at other time.

Furthermore, because the phase shifter settings (the analog beamforming weight(s) applied to the phase shifter(s) of the transmitter) need to be applied for signals transmitted to all UEs for the slot (a same beamforming weight(s) applied by the gNB for transmitting to UEs for that slot) for all PRBs in the slot. Each slot, the transmitter of a gNB may select and use one (e.g., the best) of the N analog beamforming weights or phase shifter settings to be used for transmission for that slot, although a set of only N (e.g., N=4) possible analog beamforming weights may be available, and may be set or determined at the time of manufacturing, for example.

Therefore, it may be advantageous to design or select a set of N (e.g., N=3, 4, 5, 6, 7, 8, . . . 12, . . . ) analog beamforming weights (e.g., each weight including at least a phase or phase information) that yields an acceptable, desirable or threshold (e.g., a best or optimal) beamforming gain or reference signal received power (RSRP) for a plurality of UEs, such as the set of N analog beamforming weights that provides or yields the best or optimal average beamforming gain or RSRP for or across a plurality of UEs, for example. Moreover, the gNBs or network nodes may be deployed in a range or variety of different deployment options (wireless deployment types), such as Urban Macro, Urban Micro, and Rural Macro (as examples of some deployment options or different wireless deployment types). Each of the different wireless deployment types (or deployment options) may include one or more different configurations or different parameters, e.g., such as different gNB transmission power, cell range or size of each cell, number of cells, number of UEs that can be accommodated per cell, different gNB antenna height, mechanical downtilt, etc. It may be advantageous for the determined set of N analog beamforming weights to also be determined based on, and/or adjusted based on, the parameters and/or configuration that may typically be used or applied for the various wireless deployments types (e.g., such as a mechanical downtilt for an antenna system that is typically used or applied for each of the wireless deployment types), and/or based on a manufacturer specified pre-tilt angle (or pre-tilt phase shiftings) applied by a transmitter.

Figure 2:
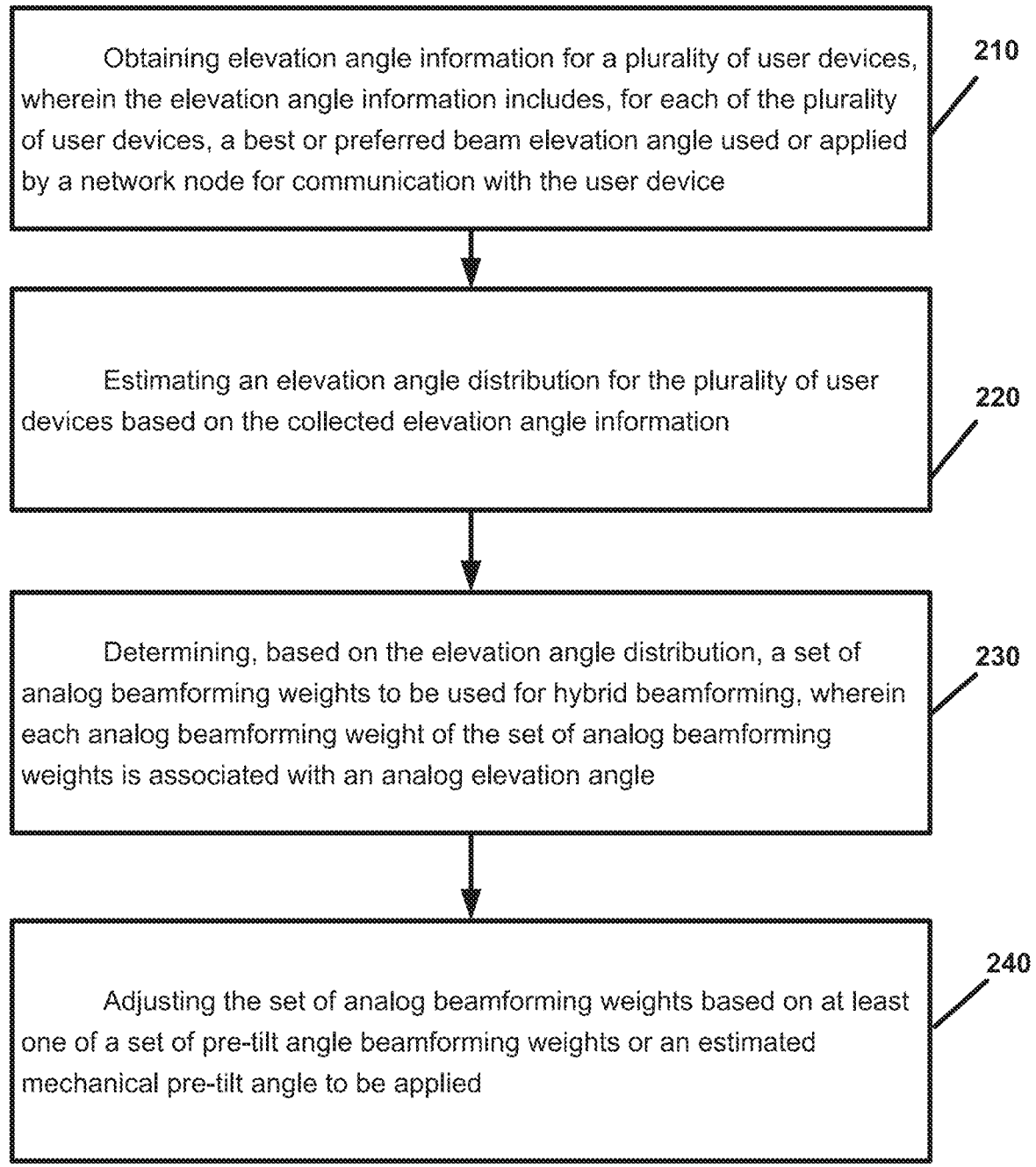
FIG. 2 is a flow chart illustrating operation of a device or node according to an example embodiment.

FIG. 2 is a flow chart illustrating operation of a device or node according to an example embodiment. A node or device, such as a network node or gNB, a UE, a core network node, or other node that may be provided within a network or located in the cloud or other location, may perform the method or operations of the flow chart of FIG. 2, for example. Operation 210 includes obtaining elevation angle information for a plurality of user devices (or UEs), wherein the elevation angle information includes, for each of the plurality of UEs, a best or preferred beam elevation angle used or applied by a network node (e.g., gNB) for communication with the UE. Operation 220 includes estimating an elevation angle distribution for the plurality of user devices based on the collected elevation angle information. Operation 230 includes determining, based on the elevation angle distribution, a set of analog beamforming weights to be used for hybrid beamforming, wherein each analog beamforming weight of the set of analog beamforming weights is associated with an analog elevation angle. Operation 240 includes adjusting the set of analog beamforming weights based on at least one of a set of pre-tilt angle beamforming weights or an estimated mechanical downtilt angle to be applied.

With respect to the method of FIG. 2, the method may further include applying the set of analog beamforming weights to inputs of one or more analog phase shifters as part of hybrid beamforming. For example, as shown in FIG. 4 described hereinbelow, 1 of N possible analog beamforming weights (wherein such analog beamforming weight(s) may be determined based on the elevation angle distribution for the plurality of UEs/user devices, and adjusted based on at least one of a set of pre-tilt angle beamforming weights or an estimated mechanical downtilt angle to be applied) may be applied to a set of one or more analog phase shifters as part of analog beamforming. Hybrid beamforming may be used, and may include both digital beamforming (e.g., with digital beamforming weights applied pre-IFFT to a digital signal at 410 of FIG. 4), and then a selected one of N (e.g., N=4 or other number) analog beamforming weights may be applied at 430 to analog phase shifters (e.g., PS1, PS2, FIG. 4) to apply analog phase shifting to an analog signal to perform analog beamforming). Pre-tilt weights 420 (FIG. 4 described below) may also be applied.

With respect to the method of FIG. 2, the adjusting the set of analog beamforming weights may include adjusting the set of analog beamforming weights based on at least one of the following to obtain an adjusted set of analog beamforming weights: a set of pre-tilt angle beamforming weights to be applied by a plurality of network nodes to provide a pre-tilt angle for wireless transmissions from a plurality of network nodes; an estimated mechanical downtilt angle to be applied to antenna systems of the plurality of network nodes; wherein the adjusted set of analog beamforming weights are to be used or applied by one or more of the plurality of network nodes to perform analog beamforming as part of hybrid beamforming for wireless transmissions.

For example, a set of pre-tilt angle beamforming weights may be specified in advance and/or may be determined by a node or device manufacturer, and may provide a pre-tilt of a beam, where the pre-tilt may be a change or adjustment of a beam direction that may be predetermined or known in advance, e.g., which may be specified by a standard, specification or may be indicated by a device or network node manufacturer. The pre-tilt angle beamforming weights may be hard coded or fixed within the circuitry of the wireless transceiver.

On the other hand, a mechanical downtilt (e.g., such as a mechanical down-tilt of 3.2 degrees) is different and separate from the pre-tilt provided by the pre-tilt angle beamforming weights. The mechanical downtilt (or mechanical beam angle adjustment) may be applied mechanically, e.g., where the wireless carrier or wireless network node (e.g., gNB) installer may, e.g., physically or mechanically adjust or tilt a direction of one or more antennas or antenna elements of the antenna system of the network node so as to provide a mechanical tilt or mechanical adjustment to the beam angle (e.g., to provide a downtilt) for the network node, for example. Different wireless deployment types may have different typical or average mechanical downtilts (different mechanical downtilt angles). According to an example embodiment, the set of analog beamforming weights may be determined and/or may be adjusted based on, e.g., at least one of the pre-tilt angle (or pre-tilt angle beamforming weights) and/or the different typical or average mechanical downtilt angles that are performed (or typically performed or provided) for different wireless deployment types.

With respect to the method of FIG. 2, the elevation angle information may include, for each UE of the plurality of UEs with respect to one of the network nodes (or gNBs), an elevation angle associated with a best beam for the UE that is used by the network node to maximize signal strength or received power for communications between the network node and the UE. For example, various measured reference signals or other measurements may be used to determine a best beam (or to determine an elevation angle associated with a best beam. For example, a best beam may be determined based on one or more of: a measured RSRP (reference signal received power) based on sounding reference signals transmitted by a UE and measured by a gNB or based on RSRP of CSI-RS signals transmitted by a gNB and measured by a UE, or based on a channel state information (CSI) report, a channel quality indicator (CQ) or precoder matrix indicator (PMI) information provided by the UE based on CSI-RS signals transmitted by a gNB and measured and reported by a UE. Any of these, as examples, may be used to determine a best beam for a UE, and hence determine a best elevation angle for the UE with respect to a gNB. Also, or alternatively, 3GPP beam management procedures, which may include procedures P1, P2 and/or P3, may be used to determine a best beam for each UE (and thus determine a best elevation (or vertical) angle and/or a best azimuth (or horizontal) angle for a UE with respect to a gNB, since the elevation angle and azimuth angle of each beam may typically be known by a gNB or other node, for example).

With respect to the method of FIG. 2, the elevation angle distribution may include an elevation angle probability distribution, including a plurality of elevation angle ranges and a percentage value or number of user devices of the plurality of user devices having a best elevation angle (e.g., elevation angle of a best beam for the UE) within each of the elevation angle ranges. As an illustrative example, the elevation angle probability distribution may include, for example: 5% of UEs have a best elevation angle in the range of 0-2 degrees; 25% of UEs have a best elevation angle in the range of 2-5 degrees; 40% of UEs have a best elevation angle in the range of 5-8 degrees; and 30% of UEs have a best elevation angle in the range of 8-10 degrees, etc. These are just illustrative examples, and other UE percentages and/or elevation angle ranges may be used or obtained for an elevation angle probability distribution.

With respect to the method of FIG. 2, the adjusting the set of N (e.g., N=4) analog beamforming weights may be performed subject to or based upon an upper bound of a maximum difference between the percentage values or numbers of the user devices (UEs) having a best elevation angle within each of the angle ranges, in order to either: obtain a more equitable distribution, within a threshold, of user devices across the angle ranges, or to provide a minimum distribution or minimum percentage of user devices within each of the angle ranges. For example, the set of N analog beamforming weights may be adjusted such the that a maximum value of 0.4 (as an example upper bound) between the highest fraction and lowest fraction of UEs within elevation angle probability distribution that consider one of the N elevation angles as its best elevation angle among the N possible elevation angle settings corresponding to the N analog beamforming weights. Thus, for example, if a lower percentage (or lower fraction) of UEs was 0.1 (or 10%) and these UEs had a best elevation angle (of an elevation angle of a best beam) in the range of 0-2 degrees that uses a first of the N analog beamforming weights (as the preferred beamforming weight), while 90% (or 0.9) of the UEs had a best elevation angle in the range of 7-10 degrees that uses a second of the N analog beamforming weights, this results in a maximum difference of 0.8 (or 80%) of the UEs between these two extremes, which is greater than the example upper bound of 0.4, for example. Thus, for example, it may be more desirable to have a more equitable distribution of UEs (or UE best elevation angles that can be obtained or associated with one of the N analog beamforming weights) across the N elevation angle ranges associated with the N analog beamforming weights. Therefore, the analog beamforming weights and/or elevation angle ranges may be adjusted in this case, e.g., such that the difference between the highest fraction of UEs and lowest fraction of UEs within elevation angle probability distribution is less than or equal to an upper bound of 0.4 (or 40%), for example. Other numbers, values, percentages, weights, and upper bound values may be used, as these are merely illustrative examples.

With respect to the method of FIG. 2, the elevation angle distribution may be obtained for a plurality of wireless deployment types, wherein the determining the set of analog beamforming weights to be used for hybrid beamforming may include determining, based on the elevation angle distribution for the plurality of wireless deployment types, the set of analog beamforming weights to be used for hybrid beamforming such that the average beamforming gain or received power is maximized (or optimized or at least increased) with respect to the plurality of user devices using the elevation angle distribution for each of the plurality of wireless deployment types and across the plurality of wireless deployment types.

With respect to the method of FIG. 2, the obtaining elevation angle distribution is performed or provided for a plurality of wireless deployment types, wherein the obtaining may include: obtaining a first set of elevation angle information for a plurality of UEs (or user devices) provided in a wireless network(s) of a first wireless deployment type (e.g., macro urban deployment type), and a second set of elevation angle information for a plurality of UEs provided in a wireless network(s) of a second wireless deployment type (e.g., micro urban deployment type).

With respect to the method of FIG. 2, the determining the set of analog beamforming weights may include determining, based on the first set of elevation angle information and the second set of elevation angle information, the set of analog beamforming weights to be used for hybrid beamforming to improve or maximize an average beamforming gain or received signal strength for the plurality of UEs (or user devices) for or across multiple wireless deployment types including the first wireless deployment type and the second wireless deployment type.

With respect to the method of FIG. 2, the estimating an elevation angle distribution for the plurality of user devices based on the collected elevation angle information may include estimating an overall elevation angle distribution based on: 1) a weighted first elevation angle distribution associated with a first wireless deployment type, and 2) a weighted second elevation angle distribution associated with a second wireless deployment type.

With respect to the method of FIG. 2, the estimating an elevation angle distribution may include: estimating a first elevation angle distribution based on the first set of elevation angle information for the first wireless deployment type; estimating a second elevation angle distribution based on the second set of elevation angle information for the second wireless deployment type; determining a first percentage of wireless networks or user devices for the first wireless deployment type and a second percentage of wireless networks or user devices for the second wireless deployment type; weighting the first elevation angle distribution based on the first percentage to obtain a weighted first elevation angle distribution; weighting the second elevation angle distribution based on the second percentage to obtain a weighted second elevation angle distribution; and obtaining an overall elevation angle distribution based on the weighted first elevation angle distribution and the weighted second elevation angle distribution.

With respect to the method of FIG. 2, the first wireless deployment type may be a macro urban deployment; and the second wireless deployment type comprises a micro urban deployment. These are illustrative examples, and other wireless deployment types may be used as well or instead.

With respect to the method of FIG. 2, the estimating the elevation angle distribution may be performed via a Bayesian parametric estimation or other Bayesian technique.

With respect to the method of FIG. 2, the estimating an elevation angle distribution may be performed iteratively by updating an uncertainty on the estimate of the elevation angle distribution via a Bayesian technique, and determining or adjusting the set of analog beamforming weights to optimize or maximize (or at least increase) beamforming gain or received power. By way of illustrating example, estimating the elevation angle distribution may include, for example, estimating the distribution of elevation angles via Bayesian parametric estimation. For example, given a (parametric) class of possible elevation distributions, parameterized by a parameter vector, estimating the distribution of elevation angles may include estimating the probability that the observed elevation distribution has been drawn from a probability distribution. Then, a Bayesian update may be performed as follows: A) set an initial prior belief on the parameter vector. If no prior information is available, then the parameter vector is uniformly distributed between 0 and 1; B) As elevation data is collected, update the belief on parameter vector via Bayes formula. Further example operations and/or details that may be used (merely as an illustrative example) for estimating (e.g., iteratively) the elevation angle distribution for a set of UEs are described hereinbelow. Other estimation techniques may be used as well.

With respect to the method of FIG. 2, the determining, based on the elevation angle distribution, the set of analog beamforming weights may be performed to optimize or maximize (or at least increase) beamforming gain, average received power or worst-case received power for the plurality of user devices.

With respect to the method of FIG. 2, the estimating the elevation angle distribution may be performed iteratively by updating an uncertainty of the estimated elevation angle distribution via a Bayesian technique; and wherein the determining, based on the elevation angle distribution for the set of analog beamforming weights may include optimizing and/or re-optimizing the set of analog beamforming weights to be used for hybrid beamforming such that the average beamforming gain or received power (e.g., RSRP) is maximized (or at least increased) for the plurality of user devices using the elevation angle distribution.

With respect to the method of FIG. 2, the estimating the elevation angle distribution may include estimating an uncertainty of the elevation angle distribution using a Bayesian technique; and wherein the determining the set of analog beamforming weights may include optimizing or determining an optimum or preferred (e.g., or best performing) set of analog beamforming weights based at least in part on the estimated uncertainty of the elevation angle distribution.

Figure 3:
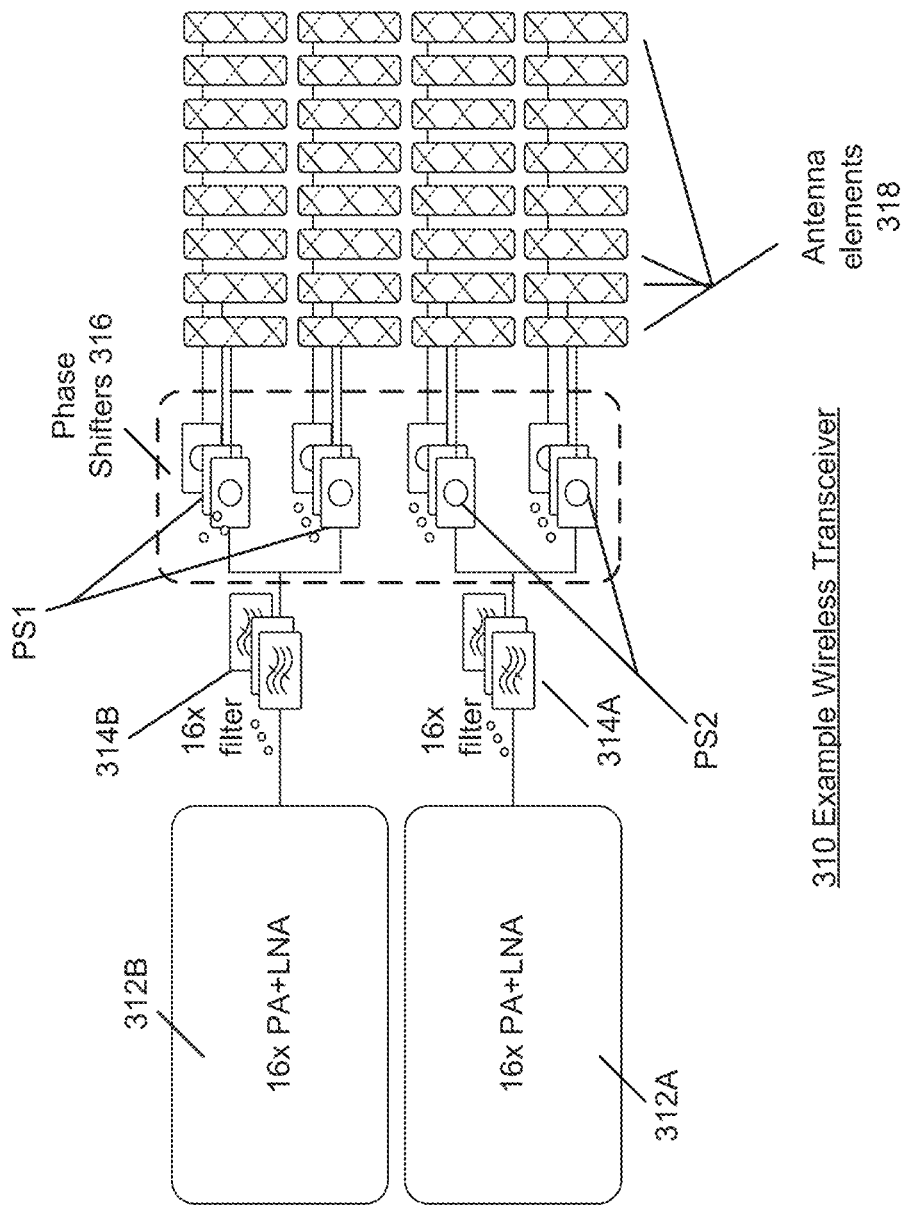
FIG. 3 is a diagram illustrating hybrid beamforming transmitter/receivers (transceivers) according to an example embodiment.

FIG. 3 is a diagram illustrating hybrid beamforming transmitter/receivers (transceivers) according to an example embodiment. The wireless transceivers (or wireless transceiver system) 310 are shown in FIG. 3 and, e.g., may illustrate at least a part (or a portion) of the components or functions that may be included in an example wireless transceiver(s). Sets (312A and 312B) of power amplifiers (PAs) and low noise amplifiers (LNAs) may amplify signals. Bandpass filters 314A and 314B may perform bandpass filtering on the amplified analog signal, which outputs the amplified and filtered signals to phase shifters 316. Phase shifters 316 (e.g., including at least PS1 and PS2, each of which may be sets of one or more phase shifters to apply a phase shift based on a received analog beamforming weight) may perform phase shifting of the amplified and bandpass filtered signal based on analog beamforming weight(s). The resulting phase shifted analog signals may be output to columns of antenna elements (or radiators) 318 or an antenna array for transmission of the signal to one or more UEs or to all UEs or a group of UEs.

FIG. 4 is a diagram illustrating further details of wireless transceivers of FIG. 3. Thus, as shown in FIG. 4, an expansion is shown for one of the columns from wireless transceiver system of FIG. 3. One column may include 4 different antenna elements driven by 2 or 4 different phase shifters. Here we have 2 phase shifters drive 8 different antenna elements. For example, each antenna element in FIG. 4 in 8 columns has 3 Xs, where there are the 3 phase shiftings (a digital weight(s), a pre-tilt weight or vector(s), and an analog beamforming weight(s)) applied to that antenna element (where that antenna element contains 3 radiators or 3 antenna elements);

In FIG. 4, the dots to left are where digital beamforming weights 410 are applied, and can be set per PRB basis. Hybrid Beam forming may include digital beamforming weights 410 applied every PRB, and also analog weights (including hard coded pre-tilt beamforming weights 420, and the 1 of N (e.g., N=4 or other number) selected analog beamforming weights 430 applied to all UEs for that slot). The effective weight applied to each cross or each antenna element may be, for example, the product of digital weight x analog phase shifter (analog beamforming weight) x pre-tilt analog weight (so three weights—applied to each X, where each X may represent, for example, a radiator or an antenna element, or a pair of antenna elements). Or alternatively, each X may represent, for example, a pair of cross-polarized radiators or antenna elements. Where there is no phase shifter, this is just a 1, no phase shifting, assuming unit/1 amplitude. Thus, for example, as shown in FIG. 4, PS1 (phase shifter 1) may include an upper phase shift path where an analog beamforming weight 430 is applied and a lower path which has simply a unit magnitude and no phase shifting is performed, and both of these paths have pre-tilt weights 420 applied. Or said in a different way, PS1 may be considered only the upper portion that applies the analog beamforming weight to perform phase shifting based on this analog beamforming weight, whereas the lower path does not have a phase shifter (no phase shifting is applied to the lower path. A similar approach or structure is shown for the other phase shifter PS2.

In addition to these three weights (e.g., a digital beamforming weight 410 applied each PRB, a selected 1 of 4 analog beamforming weight selected or applied each slot, and a hard-coded or fixed pre-tilt weight 420), a mechanical downtilt (or mechanical downtilt/pre-tilt angle) may be applied by a wireless install crew at a base station (BS) site. The historic average may be known for mechanical downtilt (or mechanical downtilt angle) for each of multiple wireless deployment types, such as micro urban and macro urban, etc., and the ratio of the different wireless deployment types may also be known (e.g., 40% of deployments are micro urban and 60% are macro urban), so the average mechanical downtilt across all (or across multiple) wireless deployment types can be determined or is known, e.g., a 3 degree mechanical downtilt for micro urban (weighted by 40%, so multiplied by 0.4) and a 5 degree mechanical downtilt for macro urban (weighted by 60%, so multiplied by 0.6), and then these products may be summed and an average calculated to determine or estimate the (e.g., weighted average of the) mechanical downtilt angle across all or the multiple wireless deployment types.

According to an example embodiment, techniques are described to determine the set of N (e.g., N=4) analog beamforming weights (phase shift values) that should or may be used, and from these, the gNB or node may select one of these N analog beamforming weights to be applied to the phase shifters PS1 and PS2, for example. To determine the set of N (e.g., N=4) analog beamforming weights or analog phase shift values that would be the best or would provide sufficient or even optimum performance, a node may: obtain elevation angle information for a plurality of UEs (e.g., a best elevation angle or an elevation angle of a best beam for the UE with respect to a gNB); estimate an elevation angle distribution (e.g., an elevation angle probability distribution for the UEs based on the elevation angle information, which may include, e.g., a number or a percentage of UEs that has a best elevation angle for each of N angle ranges; determining a set of analog beamforming weights based on the elevation angle distribution; and then adjusting the set of analog beamforming weights based on at least one of a pre-tilt angle beamforming weight and/or a mechanical downtilt angle.

A BS or gNB may determine the best propagation direction (including the best elevation angle) for a UE based on CSI reports from UE and based on sounding reference signals received from a UE. These same techniques may be used to select or adjust analog beamforming weights that optimize azimuth direction separately or both azimuth and elevation angles.

A BS (gNB), a core network node, a SON (self-optimizing network) node, or other node may determine an elevation angle distribution for a set of UEs, e.g., across many different sites (e.g., it may be done or optimized at manufacturing time, or may be performed periodically). In some cases, this selection and/or adjusting and/or optimizing or re-optimizing of a set of 4 analog phase shifter weights (set of 4 analog beamforming weights) may be updated periodically (e.g., after a certain number of slots, or each day, each week, etc.), rather than performed just once. Also, for example, the elevation angle probability distribution may include or may indicate, e.g., what percent of UEs are at (these are the best elevation angles for those UEs to maximize signal receive power) each of several elevation angles. For example, in the range of +10 (looking upward on buildings) to −30 degrees elevation angles may be 1% of UEs; in the range of an elevation angle of 9.5-9 degrees are 7% of UEs, etc. These are some illustrative examples.

In some cases, there may be estimation uncertainty. There may be multiple distinct deployment types, e.g., such as micro urban and macro urban (among other possibilities). Micro urban may be below rooftop deployment, with tall buildings, smaller cell size/smaller coverage area, while urban macro may be above rooftop deployment, with larger coverage area, for example. Mechanical downtilt might be different for these two different wireless deployments, but that is different than the hard coded pre-tilts (or pre-tilt weights). It may be known or estimated in advance what mechanical downtilt is likely to be applied for these different deployment types, e.g., urban macro typically have 6 degree downtilt, and there is typically a 0 degree downtilt for urban micro for mechanical tilt. The determining and/or adjusting of the set of N analog beamforming weights may be determined and/or adjusted based on the known pre-tilt angle beamforming weights and/or based on the estimated (which may be weighted according to the weight or frequency of different deployment types) mechanical pre-tilt angle. Thus, for example, the set of 4 analog phase shift values (set of 4 analog beamforming weights) can be selected and/or optimized/adjusted based on historical or average (and possibly weighted) mechanical tilt for the two different deployments, such as for micro urban and macro urban. While, for example, 60% of wireless deployments are urban macro and 40% are urban micro, we are not always sure; so there is some uncertainty on things (an example of estimation uncertainty that may be present).

FIG. 4 is a diagram illustrating a portion of an illustrative wireless transceiver of FIG. 3 according to an example embodiment. For example, the diagram of FIG. 4 may illustrate the components or functions of a single column or portion of the transceivers of FIG. 3, with the number of transceivers, number of phase shifters per transceiver, and the number of radiators (antenna elements) per phase shifters all shown as illustrative examples. For illustrative examples described herein, the weights, both digital beamforming weights and analog weights (e.g., including the analog beamforming weights and analog pre-tilt weights) may be assumed to be unit magnitude weights (having an amplitude of 1), although in general any amplitude may be used for the digital beamforming weights and pre-tilt weights. Let us denote by $$[1\ e^{j\frac{2\pi d}{\lambda}3\sin\theta_d}]$$

as the digital weights (or digital beamforming weights) for the digital transceivers, where the digital beamforming weights 410 may be applied at the dots shown in FIG. 4 pre-IFFT (before an Inverse Fast Fourier Transform is performed), and unlike analog weights, the digital beamforming weights may be applied per (or for) each physical resource block (PRB). Let us denote by $e^{j\theta_a}$ the analog beamforming weight (which may also be referred to as an analog phase shifter weight), where $\theta_a \in \{\theta_{a,1}, \theta_{a,2}, \theta_{a,3}, \theta_{a,4}\}$. As shown in FIG. 4, each set of 3 radiators or antenna elements are connected with the pre-tilt weights 420 or pre-tilt vector $$[1\ e^{j\frac{2\pi d}{\lambda}\sin\theta_{pt}}\ e^{j\frac{2\pi d}{\lambda}2\sin\theta_{pt}}].$$

For a 3-3-3-3 configuration the effective vector of weights (including both the analog beamforming weight and the pre-tilt vector or pre-tilt weight) would be as follows (assuming unit magnitude weights even for the digital weights):

$$W^T(\theta_a, \theta_d) = \begin{bmatrix} e^{-j\frac{2\pi d}{\lambda}3\sin\theta_a} \\ e^{j\frac{2\pi d}{\lambda}(\sin\theta_{pt}-3\sin\theta_a)} \\ e^{j\frac{2\pi d}{\lambda}(2\sin\theta_{pt}-3\sin\theta_a)} \\ 1 \\ e^{j\frac{2\pi d}{\lambda}\sin\theta_{pt}} \\ e^{j\frac{2\pi d}{\lambda}2\sin\theta_{pt}} \\ e^{j\frac{2\pi d}{\lambda}3\sin\theta_d} \\ e^{j\frac{2\pi d}{\lambda}(3\sin\theta_d+\sin\theta_{pt})} \\ e^{j\frac{2\pi d}{\lambda}(3\sin\theta_d+2\sin\theta_{pt})} \\ e^{j\frac{2\pi d}{\lambda}(3\sin\theta_d+3\sin\theta_a)} \\ e^{j\frac{2\pi d}{\lambda}(3\sin\theta_d+\sin\theta_{pt}+3\sin\theta_a)} \\ e^{j\frac{2\pi d}{\lambda}(3\sin\theta_d+2\sin\theta_{pt}+3\sin\theta_a)} \end{bmatrix}$$

According to an example embodiment, techniques are described that may adjust (e.g., optimize, or select a preferred or a best performing set) of analog beamforming weights, which is the set $\{\theta_{a,1}, \ldots, \theta_{a,N}\}$ (where N=4 above, for this example of a set of N analog beamforming weights) such that, e.g., a threshold level of performance and/or a best level of performance may be achieved, e.g., such as the best signal power (RSRP) performance and also a good or threshold distribution of UEs across these set of N weights.

In an example embodiment, the operation may include one or more of the following operations: 1) Determination of the elevation angle distribution of the UEs for these different deployment types, including a computation of its estimation uncertainty (for example, there may be estimation uncertainty in these calculations because these calculations to determine the set of analog beamforming weights is based on a limited set of UEs (best beams or best elevation angles for these limited set of UEs) and/or based on historical information for mechanical pre-tilt, and across multiple deployment types); 2) Determining a certain number (e.g., for example, N=4) of elevation angle settings (a set of N=4 analog beamforming weights) for the analog beamforming part of HBF (hybrid beamforming) such that we maximize or at least significantly improve the average beamforming gain using the distribution of elevation angles for each deployment type and across deployment types, subject to an upper bound on the maximum difference in the distribution of UEs across the different analog elevation angles. Using the analog elevation angles so obtained to determine the allowed phase shifter weights (analog beamforming weights) for the HBF antenna array. 3) Adjusting or optimizing the analog beamforming weights to obtain a threshold level of performance or a good performance in multiple (or different) user distributions (elevation angle probability distributions) scenarios and/or for multiple deployment types, via a robust optimization approach. And/or 4) In iterative fashion, update the user distribution estimation (elevation angle probability distribution for the UEs) via a Bayesian technique and re-optimize the HBF elevation angles.

Also, for example, the determining (selection) and/or adjusting of the set of N (e.g., N=4) analog beamforming weights may also, at least in some cases, be based on or may take into account one or more of the: 1) elevation angle probability distribution of UEs; 2) hard coded pre-tilt; 3) historical (or average) mechanical pre-tilt, which one or more may be based on or take into account a ratio of urban micro/urban macro deployment percentages. Thus, in this manner, this solution or selection of analog beamforming weights may allow the mechanical downtilt to be set differently for different deployments, allowing the analog beam weights to be optimized capitalizing on the knowledge that different mechanical downtilts may be set for different carriers or networks, and for different deployments. The selected set of analog beamforming weights may then be used as part of a hybrid beamforming (HBF) radio or transmission system. The radio resource management algorithms, such as the scheduler, may determine the best analog beam to use on a per-symbol (e.g., digital beamforming weights may be selected or adjusted per PRB) and/or per-slot (one of the N analog beamforming weights may be selected and used per slot) to optimize and improve the system throughput performance.

Figure 5:
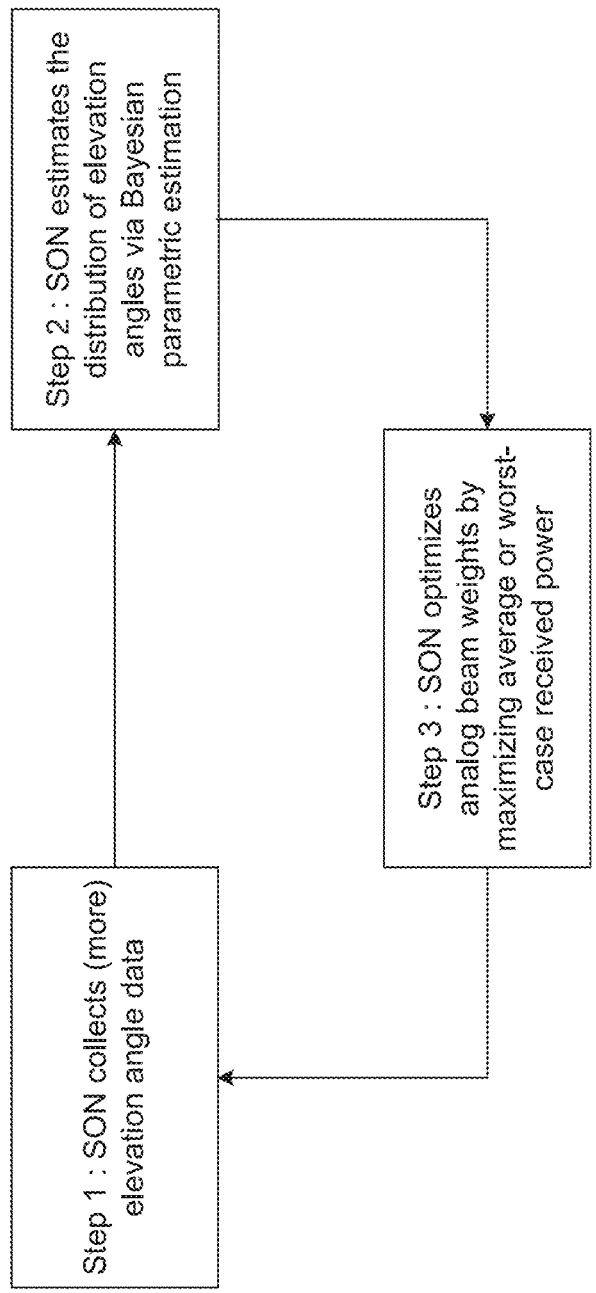
FIG. 5 is a diagram illustrating operation of a system according to an example embodiment.

FIG. 5 is a diagram illustrating operation of a system according to an example embodiment. For example, a computing node (e.g., which may be a BS/gNB, a core network node, or a node that is external to the base station/gNB, such as a Self-Organized Network (SON) node): This computing node may perform one or more of the following for example:

1) Collects a (possibly large) collection of elevation angles D=[ω₁, ω₂, . . . ] of connected users throughout a certain time window T for a certain site or cluster of sites.
2) Estimates the distribution of elevation angles via Bayesian parametric estimation.

More formally, given a (parametric) class of possible elevation distributions $F_\gamma$ parametrized by a parameter vector γ, it estimates the probability that the observed elevation distribution has been drawn from a probability distribution $f_\gamma \in F_\gamma$. Then, Bayesian update works as follows. A) Set an initial prior belief p(γ) on γ. If no prior information is available, then γ is uniformly distributed between 0 and 1, namely p(γ)=1 for all γ∈ [0; 1]. B) As elevation data D=[d₁, d₂, . . . ] is collected, update the belief on γ via Bayes formula:

$$p(\gamma \mid D) = \frac{p(D \mid \gamma) p(\gamma)}{p(D)}$$

where p(D|γ) is the posterior distribution, namely the pdf $f_\gamma := \gamma f^{UMa} + (1-\gamma) f^{UMi}$ evaluated at all elevation data points D and multiplied with each other (assuming independence of observations), i.e., $p(D|\gamma) = \Pi_{\omega \in D} F_\gamma(\omega)$.

Note that p(D) is the probability of observations and acts merely as a normalization factor (ensuring that p(γ|D) sums up to 1). C) In iterative fashion, as more data D' is collected, the prior belief p(γ) is set to the previously computed posterior, i.e., p(γ):=p(γ|D), and the procedure in step 2.B is repeated.

Uma (urban macro deployment type)/Umi (urban micro deployment type) embodiment. We now instantiate the procedure above to a practical embodiment. The class of distributions $F_\gamma$ is here defined as a convex combination of UMa (Urban Macro) and UMi (Urban Micro) distributions $f^{UMa}$, $f^{UMi}$, respectively, and γ is the convex combination parameter $F_\gamma = \{f_\gamma := \gamma f^{UMa} + (1-\gamma) f^{UMi}, \forall \gamma \in [0; 1]\}$. Distributions $f^{UMa}$, $f^{UMi}$ may be assumed known and can estimated from field measurements. Empirical distributions are also available in 3GPP Technical Reports. However, γ may not be known for the considered site or cluster of sites and may be estimated based on existing data or reports from similar sites, for example.

Moreover, we may take account for the uncertainty on γ itself, which may typically be high when little amount of historical data has been collected. To build intuitions, if the considered cluster of sites has a portion h of the sites in UMa and a portion (1−h) in UMi, then it is expected that, as more data is collected, then the distribution of γ converges to a Dirac's delta centered in h. Bayesian parametric estimation, as formalized above, translates such reasonable intuitions into a principled or practical approach.

3) Optimizes the beam angles. Once the user (UE) elevation angle distribution has been estimated as in step 2 above, the SON node optimizes the N (N=4, for example) analog beamforming weights $\theta_{a,1}, \ldots, \theta_{a,N}$ as follows. We assume that for a UE at an angle of ω, the UE's channel can be approximated as the line-of-sight channel:

$$H(\omega) = \left[1 \; e^{j\frac{2\pi d}{\lambda}\sin\omega}, e^{2j\frac{2\pi d}{\lambda}\sin\omega}, \ldots, e^{11j\frac{2\pi d}{\lambda}\sin\omega}\right]$$

Then, we have two options to optimize the beamforming weights $\theta_{a,1}, \ldots, \theta_{a,N}$.

A) Option 1: Maximize average performance. Given the parametric distribution of elevation angle distribution estimated from data as in step 2, the SON node maximizes the average, to be precise expected, received power with respect to the estimated distribution of the unknown parameter γ. This is subject to the constraint that the maximum difference in percentage of UEs considering each beam as the best beam is small enough, so that a more equitable distribution of UEs across the beams may be achieved, for example, based on the following (other techniques may be used as well):

$$\max_{\{\theta_{a,1},\ldots,\theta_{a,N}\} \in [0,2\pi]^N} \int p(\gamma)$$

$$\int f_\gamma(\omega) \max_{\theta_a \in \{\theta_{a,1},\ldots,\theta_{a,N}\}} \max_{\theta_d} \|H(\omega) W^*(\theta_a, \theta_d)\|^2 d\omega d\gamma$$

$$\text{subject to} \max_{\theta_{a,i} \in \{\theta_{a,1},\ldots,\theta_{a,N}\}} P(\theta_{a,i}) - \min_{\theta_{a,i} \in \{\theta_{a,1},\ldots,\theta_{a,N}\}} P(\theta_{a,i}) \le \epsilon$$

where $P(\theta_{a,i}) = \int p(\gamma) \int_{\left\{\underset{\theta_a \in \{\theta_{a,1},\ldots,\theta_{a,N}\}}{\text{argmax}} \max_{\theta_d} \|H(\omega) W^*(\theta_a,\theta_d)\|^2 = \theta_{a,i}\right\}} f_\gamma(\omega) d\omega d\gamma.$ In practical implementations, all integrals above can be replaced by finite sums over a discrete support set of quantized angles.

B) Option 2: Robust optimization—maximize performance in the worst case. The parametric estimation of the elevation angles estimates a likelihood p(γ) that the users are scattered over space with angle distribution $f_\gamma$. We define a likelihood threshold τ (i.e., τ=10⁻²) and define the set $L_\tau$ as the set of parameter values γ such that the associated angle distribution $f_\gamma$ is "likely enough", i.e., it has likelihood higher than τ. More formally, $L_\tau = \{\gamma : p(\gamma) \ge \tau\}$.

Then, one optimizes beamforming weights $\theta_{a,1}, \ldots, \theta_{a,N}$ as maximizing the received power in the worst case across all "likely" user angle distribution $L_\tau$, as follows:

$$\max_{\{\theta_{a,1},\ldots,\theta_{a,N}\} \in [0,2\pi]^N} \min_{\gamma \in L_\tau} \int f_\gamma(\omega) \max_{\theta_a \in \{\theta_{a,1},\ldots,\theta_{a,N}\}} \max_{\theta_d} \|H(\omega) W^*(\theta_a, \theta_d)\|^2 d\omega$$

$$\text{subject to} \max_{\theta_{a,i} \in \{\theta_{a,1},\ldots,\theta_{a,N}\}} P(\theta_{a,i}) - \min_{\theta_{a,i} \in \{\theta_{a,1},\ldots,\theta_{a,N}\}} P(\theta_{a,i}) \le \epsilon$$

where $P(\theta_{a,i}) = \int p(\gamma) \int_{\left\{\underset{\theta_a \in \{\theta_{a,1},\ldots,\theta_{a,N}\}}{\text{argmax}} \max_{\theta_d} \|H(\omega) W^*(\theta_a,\theta_d)\|^2 = \theta_{a,i}\right\}} f_\gamma(\omega) d\omega d\gamma.$ UMa/UMi embodiment (continued). We here continue the discussion on the UMa/UMi embodiment. For UMa and UMi and other scenarios, the operators may use different mechanical down-tilts. The analog beam weights may be chosen such that it capitalizes on the mechanical downtilt to further optimize the performance. Let us denote by $\theta_m^{Uma}$ and $\theta_m^{Umi}$ the mechanical downtilts chosen for UMa and UMi scenarios, respectively. Note that these mechanical downtilt values may themselves be subject to a separate optimization, which is not considered in this formulation. Let $W^*(\theta_m^{Uma}, \theta_a, \theta_d)$, $W^*(\theta_m^{Umi}, \theta_a, \theta_d)$ be the weight vector for UMa and UMi scenario with the appropriate mechanical down-tilt taken into account, respectively.

Then, the objective function in option 1 above becomes:

$$\max_{\{\theta_{a,1},\ldots,\theta_{a,N}\}\in[0,2\pi]^N} \int p(\gamma)\bigg(\gamma \int f_{UMa}(\omega)$$

$$\max_{\theta_a\in\{\theta_{a,1},\ldots,\theta_{a,n}\}} \max_{\theta_d} \|H(\omega)W^*(\theta_m^{UMa},\theta_a,\theta_d)\|^2 d\omega d\gamma +$$

$$(1-\gamma)\int f_{UMi}(\omega) \max_{\theta_a\in\{\theta_{a,1},\ldots,\theta_{a,N}\}} \max_{\theta_d} \|H(\omega)W^*(\theta_m^{UMi},\theta_a,\theta_d)\|^2 d\omega d\gamma\bigg)$$

Option 2 may be modified accordingly in analogous way.

Evaluation Results for Various Scenarios

We here evaluate performance on simulation for option 1 in the case of UMa/UMi embodiment, where we maximize average performance, under the assumption that sufficient data has been collected and p(ω) can be approximated as a Dirac's delta centered in the true value of ω.

Figure 6:
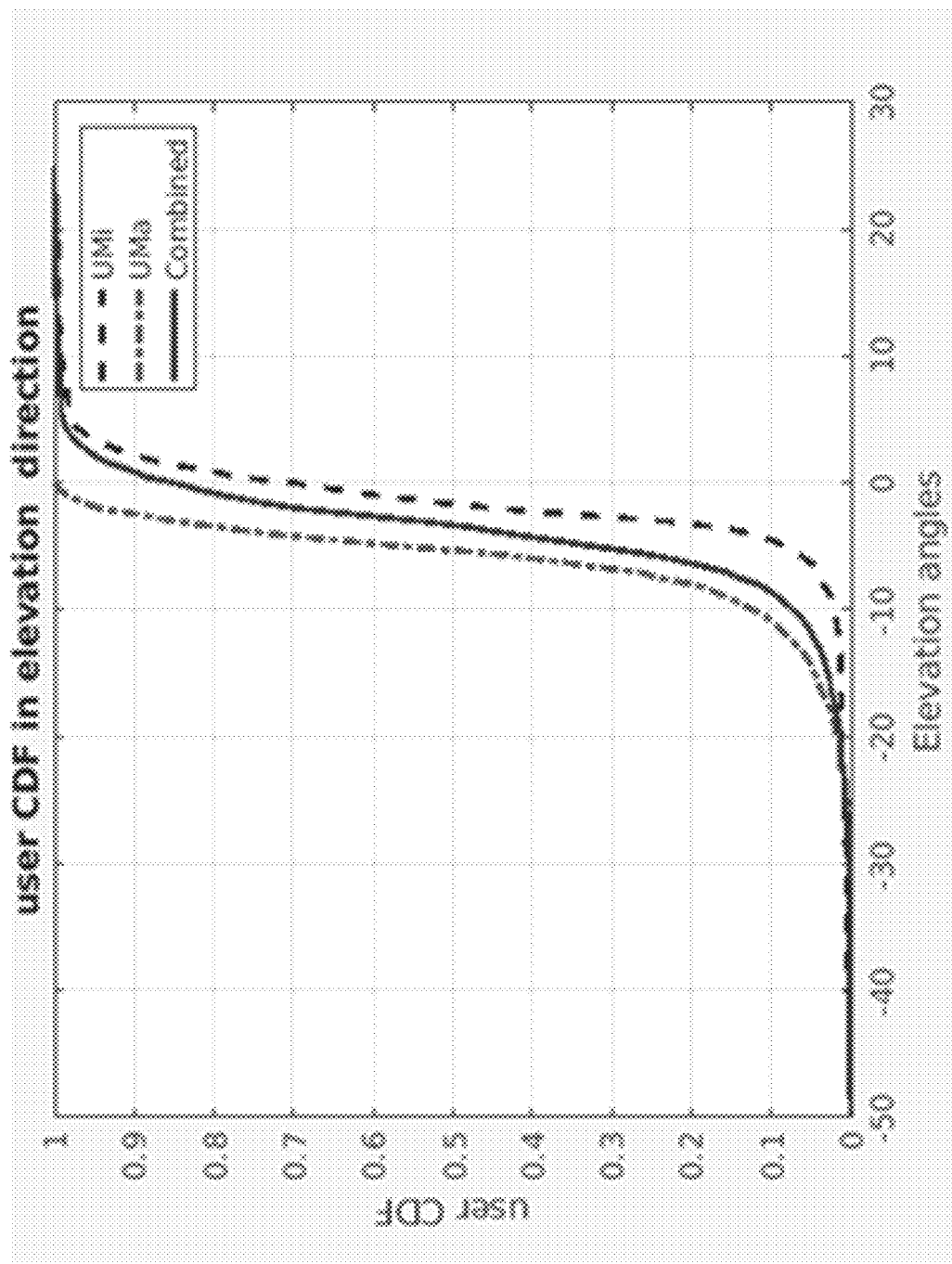
FIG. 6 is a diagram illustrating example cumulative distribution function (CDF) of elevation distribution of UEs (or best UE elevation angles) for a set of UEs according to an illustrative example.
Figure 7:
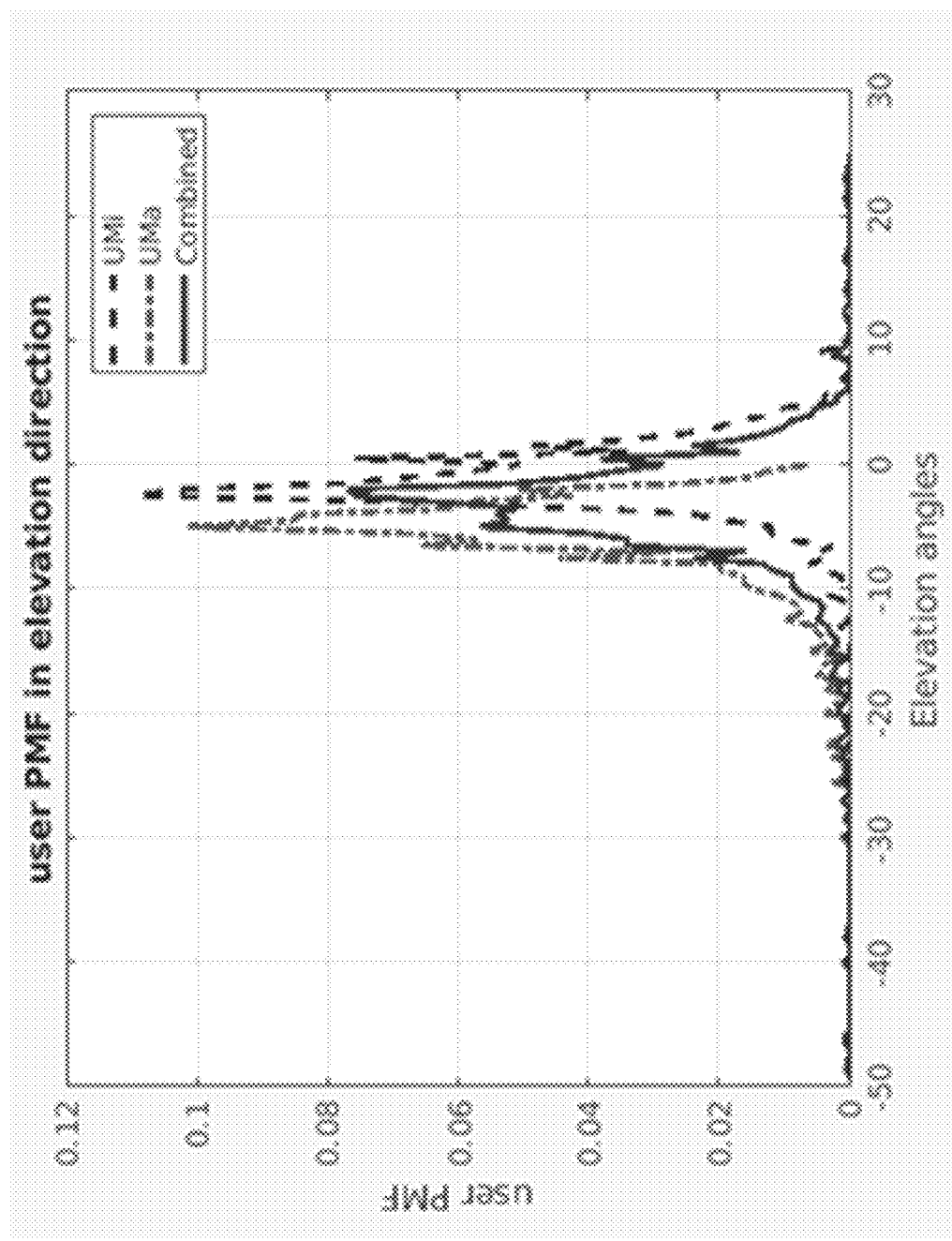
FIG. 7 is a diagram illustrating a probability mass function (PMF) of elevation distribution of UEs for UMa, UMi and combined UMa and UMi deployment scenarios according to an illustrative example.

FIG. 6 is a diagram illustrating example cumulative distribution function (CDF) of elevation distribution of UEs (or best UE elevation angles) for a set of UEs according to an illustrative example. Information is shown for urban micro (UMi), urban macro (UMa), and combined (UMi and UMa). Likewise, FIG. 7 is a diagram illustrating a probability mass function (PMF) of elevation distribution of UEs for UMa, UMi and combined UMa and UMi deployment scenarios according to an illustrative example. In examples of FIGS. 6 and 7, the CDF and PMF of the UMa and UMi elevation angles are shown for the UEs as seen by the base station (gNB). These angles are obtained from the system level simulator. These UE elevation angle distributions can be obtained from measurement campaigns and field measurements also. The UMa and UMi elevation distribution of users (UEs) are used to obtain a combined distribution, assuming a 50% probability each of the deployment being a UMa and a UMi deployment, comprising of elevation angle distribution of UEs from both the UMa and UMi scenarios. The combined distribution is used in the above constrained optimization problem to obtain beam set angles suitable for both deployment scenarios. The combined distribution is obtained by providing an equal weightage to the UMa and UMi elevation distribution of UEs. Non equal weightage can also be considered or performed in a similar straightforward manner.

The elevation angle distribution of UEs were obtained with a 0.5-degree granularity. This limits the ability of the constrained optimization problem to obtain an equitable distribution of UEs among the analog elevation beams. Hence a distribution of the UEs in the elevation direction with finer granularity is required to obtain beams over which there is an equitable distribution of UEs. A Gaussian approximation on the elevation user distribution was used to obtain vertical user distribution with granularity of 0.01 degrees. The Gaussian approximation was realized by making the mean of the Gaussian distribution to be the mode of the combined UMa and UMi distribution. The variance of the Gaussian distribution was obtained by equating it to the sample variance of the combined UMa and UMi distribution. The distribution can be approximated using other methods also, such as, a polynomial approximation, cubic spline approximation, etc. In addition, the user distribution in the elevation direction with finer granularity can be obtained from field measurements and used here.

Figure 8:
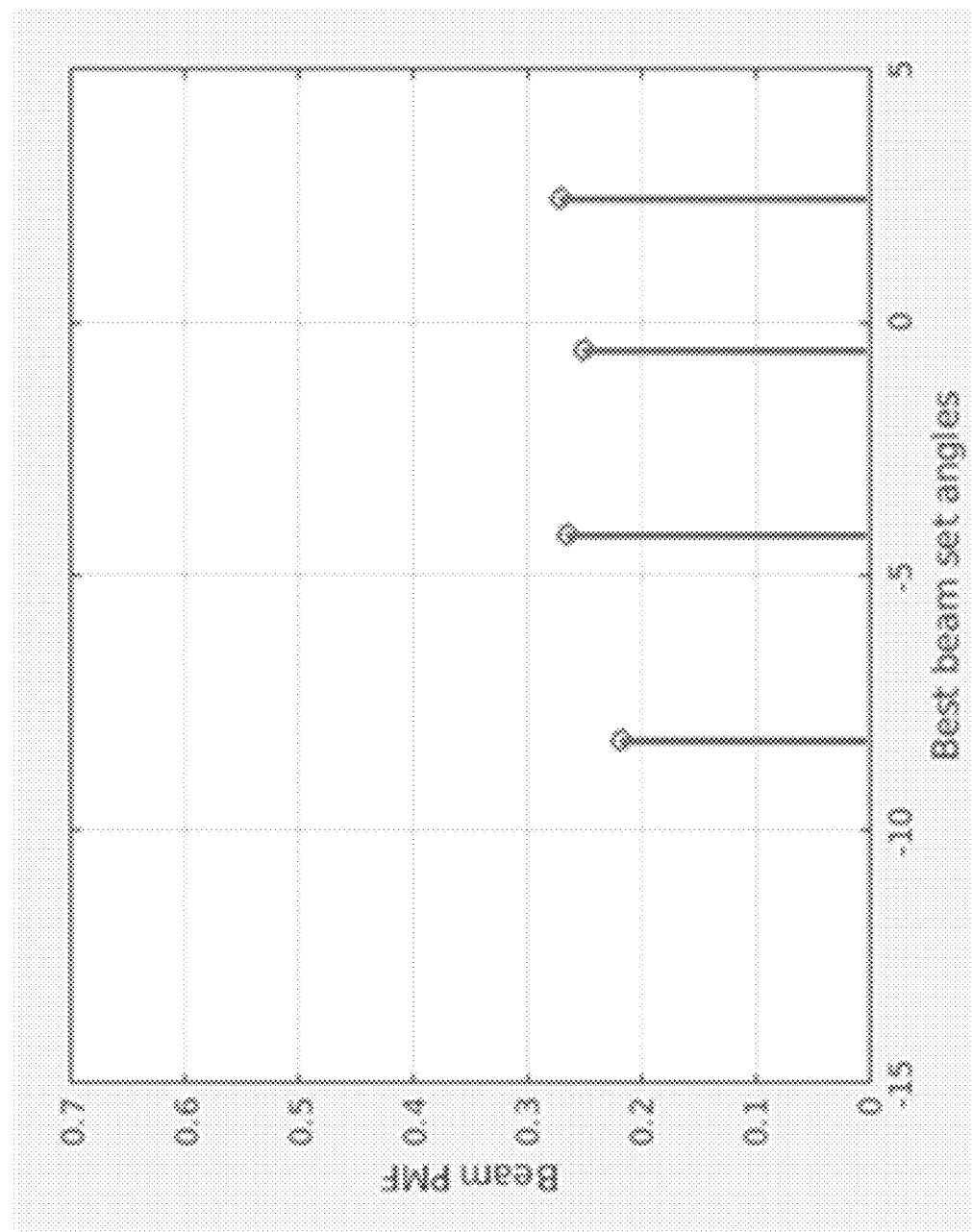
FIG. 8 is a diagram illustrating a best beam set of angles obtained from the combined UMa and UMi UE distribution according to an illustrative example.

FIG. 8 is a diagram illustrating a best beam set of angles obtained from the combined UMa and UMi UE distribution according to an illustrative example. According to an example embodiment, the best beam set obtained from the combined UMa and UMi UE distribution and using the constrained optimization problem is shown in FIG. 8. The constraint was that the difference between the maximum value of best beam PMF and the minimum value of best beam PMF should be less than or equal to 0.06. An example of a best beam set obtained from the constrained optimization were (or may be) the following:

TABLE 1

| Beam-ID | 1 | 2 | 3 | 4 |
|---|---|---|---|---|
| Best Beam Angles (degrees) | 2.44 | −0.56 | −4.19 | −8.23 |
| Best Beam PMF | 0.27 | 0.25 | 0.26 | 0.22 |

The difference in the maximum value of the best beam PMF and minimum value of the best beam PMF [Max (BestBeamPMF)-Min(BestBeamPMF)] achieved from the optimization was 0.0535. The maximum value of the objective function was 9.9517. The objective was maximized while satisfying the constraints. The beam PMFs obtained indicate a reasonably equitable distribution of UEs across the beams (approximately around 25% for each beam).

Figure 9:
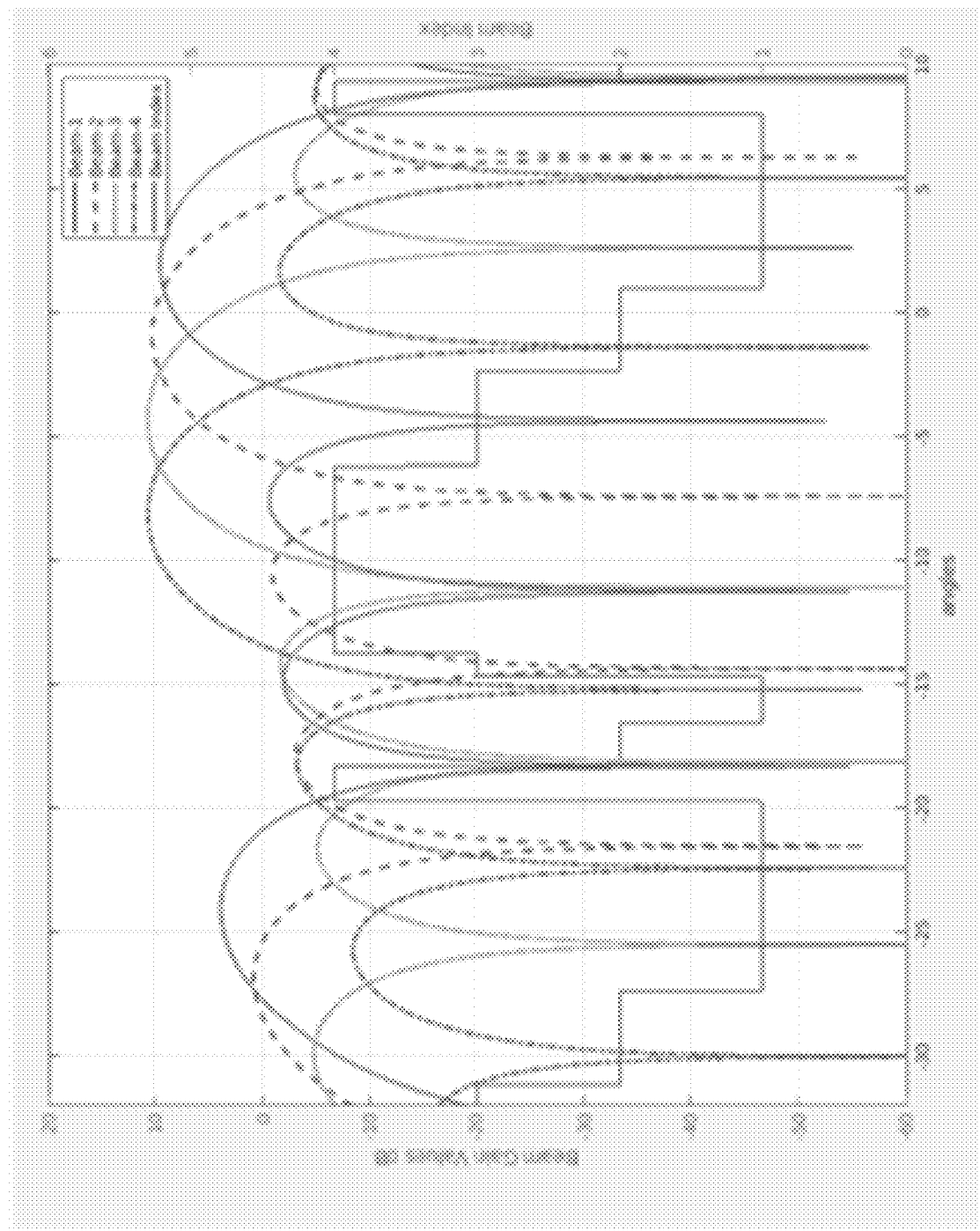
FIG. 9 is a diagram illustrating a beamforming gain pattern of the best beam set angles and the beam-ID chosen for various beam angles of the UEs according to an illustrative example.

FIG. 9 is a diagram illustrating a beamforming gain pattern of the best beam set angles and the beam-ID chosen for various beam angles of the UEs according to an illustrative example. In FIG. 9, the beamforming gain pattern of the elevation beams are plotted for the angles ranging from −32 degrees to +10 degrees. This is the typical maximum range in the elevation direction of the UE distributions. This is evident from the PDF of the elevation distribution of users in the UMa and UMi deployment scenarios as seen in FIG. 7. Also, for the same angle range, the best beam-IDs from among the chosen beams shown in Table 1 that maximizes the beamforming gain is also plotted. From the range of around −14 degrees to +7 degrees, the main lobe gain determines the best beam. For the other angles the side lobe gain may determine the beams.

Figure 10:
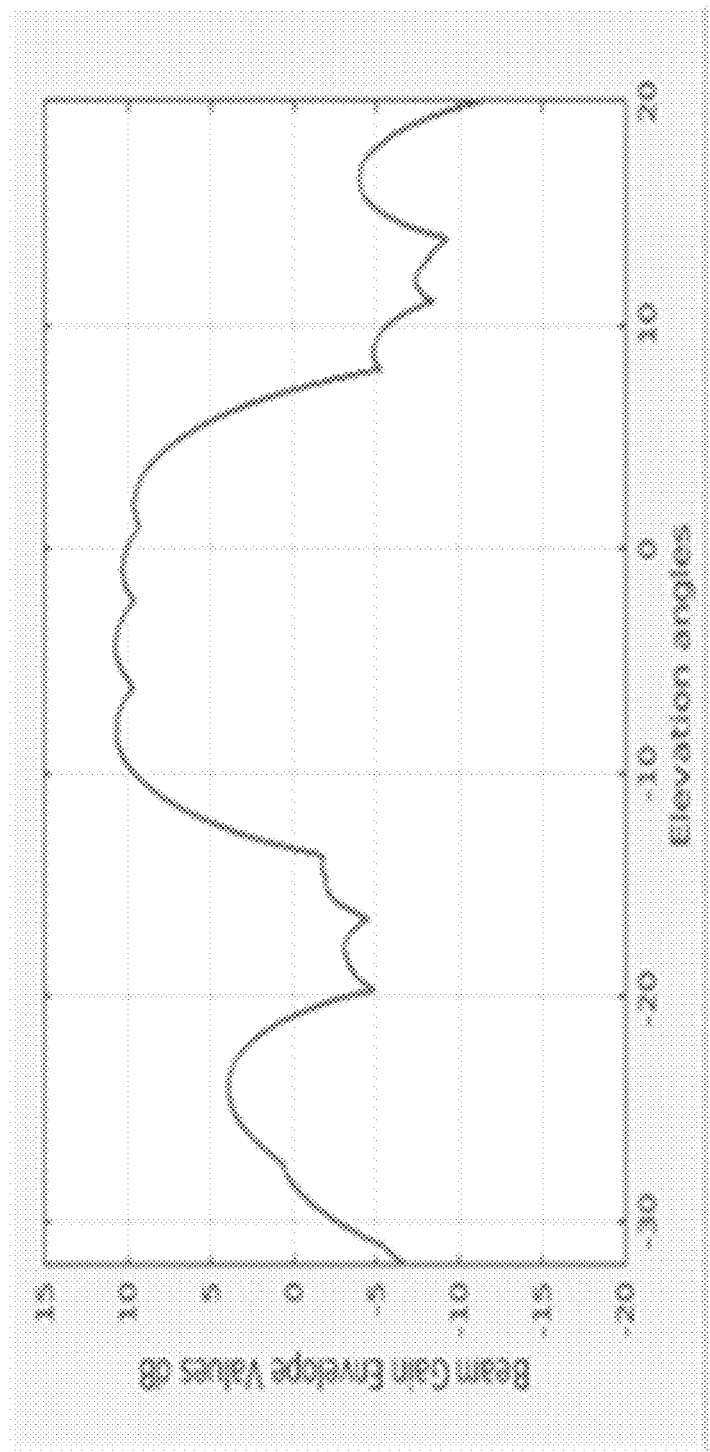
FIG. 10 is a diagram illustrating the envelope of the beam-forming gain patterns of the beams over the range of elevation angles according to an illustrative example.

FIG. 10 is a diagram illustrating the envelope of the beam-forming gain patterns of the beams over the range of elevation angles according to an illustrative example. In FIG. 10, the envelope of the beam gains of the 4 elevations beams obtained from the constrained optimization is plotted. As is evident, the difference in the maximum and the minimum beam gains is around 15 dB. Also evident is the absence of notches in the envelope of the beam gains over the range of angles.

FIG. 11 shows Table 2, which illustrates summary results for constrained optimization of a set of best beams according to an illustrative example. As shown in Table 1 FIG. 11), we vary the constraint Max(BestBeamPMF)-Min(BestBeamPMF) in constrained optimization problem from 0.06 to 0.3. The constraint is tight when the Max(BestBeamPMF)-Min(BestBeamPMF) is 0.06 and is relaxed as the difference Max(BestBeamPMF)-Min(BestBeamPMF) is increased to 0.3. As the constraint is varied the beam angles and the beam PMF are obtained from the optimization. The results are summarized in Table 2. The actual difference Max(BestBeamPMF)-Min(BestBeamPMF) obtained as the constraint is varied is also shown. We can see that we can achieve beam sets with more equitable distribution of the UEs without sacrificing significantly on the Max objective function value which is the beam forming gain. This helps the hybrid beam-forming scheme in maximizing the beamforming gain across users without significantly sacrificing on the throughput due to the analog beam constraint of having to only use that single analog beam for all scheduled UEs in that slot. The MaxObjFun value reduces by only 0.07 while the constrained is made tighter while going from 0.3 to 0.06. The MaxObjFun (or maximum objective function) may be a function or output that represents the highest achieved average beamforming gain, given the distribution of the UE elevation angles across multiple deployments or deployment types (or even across all deployment types), and for the chosen set of analog beamforming weights. Thus, we can get beams which maximizes the beamforming gain while obtaining an equitable distribution of UEs across the beams. The more equitable distribution of UEs across beams helps ensure that the beamforming gain realized on a per-UE basis is not sacrificed significantly when we schedule multiple UEs with the analog beam scheduling constraint.

Some further examples will be provided.

Example 1. A method may include: obtaining elevation angle information for a plurality of user devices, wherein the elevation angle information includes, for each of the plurality of user devices, a best or preferred beam elevation angle used or applied by a network node for communication with the user device; estimating an elevation angle distribution for the plurality of user devices based on the collected elevation angle information; determining, based on the elevation angle distribution, a set of analog beamforming weights to be used for hybrid beamforming, wherein each analog beamforming weight of the set of analog beamforming weights is associated with an analog elevation angle; and adjusting the set of analog beamforming weights based on at least one of a set of pre-tilt angle beamforming weights or an estimated mechanical downtilt angle to be applied.

Example 2. The method of example 1, further comprising: applying the set of analog beamforming weights to inputs of one or more analog phase shifters as part of hybrid beamforming.

Example 3. The method of any of examples 1-2, wherein the adjusting the set of analog beamforming weights comprises: adjusting the set of analog beamforming weights based on at least one of the following to obtain an adjusted set of analog beamforming weights: a set of pre-tilt angle beamforming weights to be applied by a plurality of network nodes to provide a pre-tilt angle for wireless transmissions from a plurality of network nodes; an estimated mechanical downtilt or mechanical pre-tilt angle to be applied to antenna systems of the plurality of network nodes; wherein the adjusted set of analog beamforming weights are to be used or applied by one or more of the plurality of network nodes to perform analog beamforming as part of hybrid beamforming for wireless transmissions.

Example 4. The method of any of examples 1-3, wherein the elevation angle information includes, for each user device of the plurality of user devices with respect to one of the network nodes, an elevation angle associated with a best beam that is used by the network node to maximize signal strength or received power for communications between the network node and the user device.

Example 5. The method of any of examples 1-4, wherein the elevation angle distribution comprises an elevation angle probability distribution, including a plurality of elevation angle ranges and a percentage value or number of user devices of the plurality of user devices having a best elevation angle within each of the elevation angle ranges.

Example 6. The method of example 5 wherein the adjusting the set of analog beamforming weights is performed subject to or based upon an upper bound of a maximum difference between the percentage values or numbers of the user devices having a best elevation angle within each of the angle ranges, in order to either: obtain a more equitable distribution, within a threshold, of user devices across the angle ranges, or to provide a minimum distribution or minimum percentage of user devices within each of the angle ranges.

Example 7. The method of any of examples 1-6, wherein the elevation angle distribution is obtained for a plurality of wireless deployment types, wherein the determining the set of analog beamforming weights to be used for hybrid beamforming comprises: determining, based on the elevation angle distribution for the plurality of wireless deployment types, the set of analog beamforming weights to be used for hybrid beamforming such that the average beamforming gain or received power is maximized with respect to the plurality of user devices using the elevation angle distribution for each of the plurality of wireless deployment types and across the plurality of wireless deployment types.

Example 8. The method of any of examples 1-7, wherein the obtaining elevation angle distribution is performed or provided for a plurality of wireless deployment types, wherein the obtaining comprises: obtaining a first set of elevation angle information for a plurality of user devices provided in a wireless network(s) of a first wireless deployment type, and a second set of elevation angle information for a plurality of user devices provided in a wireless network(s) of a second wireless deployment type.

Example 9. The method of example 8, wherein the determining the set of analog beamforming weights comprises: determining, based on the first set of elevation angle information and the second set of elevation angle information, the set of analog beamforming weights to be used for hybrid beamforming to improve or maximize an average beamforming gain or received signal strength for the plurality of user devices for or across multiple wireless deployment types including the first wireless deployment type and the second wireless deployment type.

Example 10. The method of any of examples 1-9, wherein the estimating an elevation angle distribution for the plurality of user devices based on the collected elevation angle information comprises: estimating an overall elevation angle distribution based on: 1) a weighted first elevation angle distribution associated with a first wireless deployment type, and 2) a weighted second elevation angle distribution associated with a second wireless deployment type.

Example 11. The method of example 10 wherein the estimating an elevation angle distribution comprises: estimating a first elevation angle distribution based on the first set of elevation angle information for the first wireless deployment type; estimating a second elevation angle distribution based on the second set of elevation angle information for the second wireless deployment type; determining a first percentage of wireless networks or user devices for the first wireless deployment type and a second percentage of wireless networks or user devices for the second wireless deployment type; weighting the first elevation angle distribution based on the first percentage to obtain a weighted first elevation angle distribution; weighting the second elevation angle distribution based on the second percentage to obtain a weighted second elevation angle distribution; and obtaining an overall elevation angle distribution based on the weighted first elevation angle distribution and the weighted second elevation angle distribution.

Example 12. The method of any of examples 8-11, wherein: the first wireless deployment type comprises a macro urban deployment; and the second wireless deployment type comprises a micro urban deployment.

Example 13. The method of any of examples 1-12, wherein the estimating the elevation angle distribution is performed via a Bayesian parametric estimation or other Bayesian technique.

Example 14. The method of any of examples 1-13, wherein the estimating an elevation angle distribution is performed iteratively by updating an uncertainty on the estimate of the elevation angle distribution via a Bayesian technique, and determining or adjusting the set of analog beamforming weights to optimize or maximize beamforming gain or received power.

Example 15. The method of any of examples 1-14, wherein the determining, based on the elevation angle distribution, the set of analog beamforming weights is performed to optimize or maximize beamforming gain, average received power or worst-case received power for the plurality of user devices.

Example 16. The method of any of examples 1-15, wherein the estimating the elevation angle distribution is performed iteratively by updating an uncertainty of the estimated elevation angle distribution via a Bayesian technique; and wherein the determining, based on the elevation angle distribution for the set of analog beamforming weights comprises optimizing and/or re-optimizing the set of analog beamforming weights to be used for hybrid beamforming such that the average beamforming gain or received power is maximized for the plurality of user devices using the elevation angle distribution.

Example 17. The method of example 1: wherein the estimating the elevation angle distribution comprises estimating an uncertainty of the elevation angle distribution using a Bayesian technique; and wherein the determining the set of analog beamforming weights comprises optimizing or determining an optimum or preferred set of analog beamforming weights based at least in part on the estimated uncertainty of the elevation angle distribution.

Example 18. A non-transitory computer-readable storage medium comprising instructions stored thereon that, when executed by at least one processor, are configured to cause a computing system to perform the method of any of examples 1-17.

Example 19. An apparatus comprising means for performing the method of any of claims 1-17.

Example 20. An apparatus comprising: at least one processor; and at least one memory including computer program code; the at least one memory and the computer program code configured to, with the at least one processor, cause the apparatus at least to perform the method of any of claims 1-17.

Example 21. An apparatus comprising: at least one processor; and at least one memory including computer program code; the at least one memory and the computer program code configured to, with the at least one processor, cause the apparatus to: obtain elevation angle information for a plurality of user devices, wherein the elevation angle information includes, for each of the plurality of user devices, a best or preferred beam elevation angle used or applied by a network node for communication with the user device; estimate an elevation angle distribution for the plurality of user devices based on the collected elevation angle information; determine, based on the elevation angle distribution, a set of analog beamforming weights to be used for hybrid beamforming, wherein each analog beamforming weight of the set of analog beamforming weights is associated with an analog elevation angle; and adjust the set of analog beamforming weights based on at least one of a set of pre-tilt angle beamforming weights or an estimated mechanical downtilt angle to be applied.

Example 22. The apparatus of example 21, wherein the computer program code and the at least one processor configured to adjust comprises the computer program code and the at least one processor configured to: adjust the set of analog beamforming weights based on at least one of the following to obtain an adjusted set of analog beamforming weights: a set of pre-tilt angle beamforming weights to be applied by a plurality of network nodes to provide a pre-tilt angle for wireless transmissions from a plurality of network nodes; an estimated mechanical downtilt angle to be applied to antenna systems of the plurality of network nodes; wherein the adjusted set of analog beamforming weights are to be used or applied by one or more of the plurality of network nodes to perform analog beamforming as part of hybrid beamforming for wireless transmissions.

Figure 12:
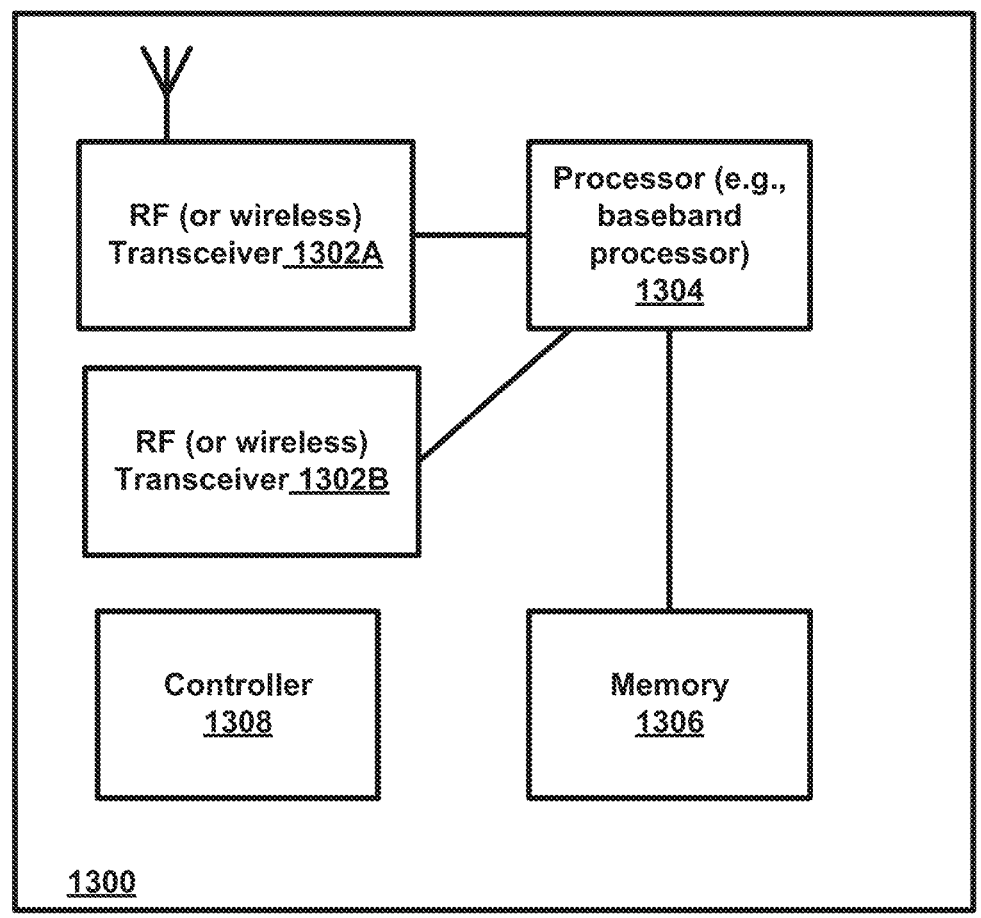
FIG. 12 is a block diagram of a wireless station or node (e.g., network node, user node or UE, relay node, SON node, or other node).

FIG. 12 is a block diagram of a wireless station or node (e.g., UE, user device, AP, BS, eNB, gNB, RAN node, network node, TRP, or other node) 1300 according to an example embodiment. The wireless station 1300 may include, for example, one or more (e.g., two as shown in FIG. 12) RF (radio frequency) or wireless transceivers 1302A, 1302B, where each wireless transceiver includes a transmitter to transmit signals and a receiver to receive signals. The wireless station also includes a processor or control unit/entity (controller) 1304 to execute instructions or software and control transmission and receptions of signals, and a memory 1306 to store data and/or instructions.

Processor 1304 may also make decisions or determinations, generate frames, packets or messages for transmission, decode received frames or messages for further processing, and other tasks or functions described herein. Processor 1304, which may be a baseband processor, for example, may generate messages, packets, frames or other signals for transmission via wireless transceiver 1302 (1302A or 1302B). Processor 1304 may control transmission of signals or messages over a wireless network, and may control the reception of signals or messages, etc., via a wireless network (e.g., after being down-converted by wireless transceiver 1302, for example). Processor 1304 may be programmable and capable of executing software or other instructions stored in memory or on other computer media to perform the various tasks and functions described above, such as one or more of the tasks or methods described above. Processor 1304 may be (or may include), for example, hardware, programmable logic, a programmable processor that executes software or firmware, and/or any combination of these. Using other terminology, processor 1304 and transceiver 1302 together may be considered as a wireless transmitter/receiver system, for example.

In addition, referring to FIG. 12, a controller (or processor) 1308 may execute software and instructions, and may provide overall control for the station 1300, and may provide control for other systems not shown in FIG. 12, such as controlling input/output devices (e.g., display, keypad), and/or may execute software for one or more applications that may be provided on wireless station 1300, such as, for example, an email program, audio/video applications, a word processor, a Voice over IP application, or other application or software.

In addition, a storage medium may be provided that includes stored instructions, which when executed by a controller or processor may result in the processor 1304, or other controller or processor, performing one or more of the functions or tasks described above.

According to another example embodiment, RF or wireless transceiver(s) 1302A/1302B may receive signals or data and/or transmit or send signals or data. Processor 1304 (and possibly transceivers 1302A/1302B) may control the RF or wireless transceiver 1302A or 1302B to receive, send, broadcast or transmit signals or data.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    obtaining elevation angle information for a plurality of user devices, wherein the elevation angle information includes, for each of the plurality of user devices, a best or preferred beam elevation angle used by a network node for communication with the user device;
    estimating an elevation angle distribution for the plurality of user devices based on the elevation angle information;

determining, based on the elevation angle distribution, a set of analog beamforming weights to be used for hybrid beamforming, wherein each analog beamforming weight of the set of analog beamforming weights is associated with an analog elevation angle; and adjusting the set of analog beamforming weights based on at least one of a set of pre-tilt angle beamforming weights or an estimated mechanical downtilt angle.

2. The method of claim 1, further comprising:
applying the adjusted set of analog beamforming weights to inputs of one or more analog phase shifters as part of the hybrid beamforming.

3. The method of claim 1, wherein the adjusting the set of analog beamforming weights comprises:
adjusting the set of analog beamforming weights based on at least one of the following to obtain an adjusted set of analog beamforming weights:
the set of pre-tilt angle beamforming weights to be applied by a plurality of network nodes to provide a pre-tilt angle for wireless transmissions from the plurality of network nodes; and
the estimated mechanical downtilt angle to be applied to antenna systems of the plurality of network nodes;
wherein the adjusted set of analog beamforming weights are to be used by one or more of the plurality of network nodes to perform analog beamforming as part of the hybrid beamforming for the wireless transmissions.

4. The method of claim 1, wherein the elevation angle distribution comprises an elevation angle probability distribution, including a plurality of elevation angle ranges and a percentage value or number of user devices of the plurality of user devices having a best elevation angle within each of the elevation angle ranges.

5. The method of claim 4, wherein the adjusting the set of analog beamforming weights is performed subject to or based upon an upper bound of a maximum difference between the percentage values or numbers of the user devices having the best elevation angle within each of the elevation angle ranges, in order to either: (i) obtain a more equitable distribution, within a threshold, of the user devices across the elevation angle ranges, or (ii) provide a minimum distribution or minimum percentage of user devices within each of the elevation angle ranges.

6. The method of claim 1, wherein the estimating elevation angle distribution is performed or provided for a plurality of wireless deployment types, wherein the estimating comprises:
obtaining a first set of elevation angle information for a first plurality of the user devices provided in at least one wireless network of a first wireless deployment type, and a second set of elevation angle information for a second plurality of the user devices provided in at least one wireless network of a second wireless deployment type.

7. The method of claim 6, wherein the determining the set of analog beamforming weights comprises:
determining, based on the first set of elevation angle information and the second set of elevation angle information, the set of analog beamforming weights to be used for the hybrid beamforming to improve or maximize an average beamforming gain or received signal strength for the plurality of user devices for or across multiple wireless deployment types including the first wireless deployment type and the second wireless deployment type.

8. The method of claim 1, wherein the estimating an elevation angle distribution for the plurality of user devices based on the elevation angle information comprises:
estimating an overall elevation angle distribution based on: 1) a weighted first elevation angle distribution associated with a first wireless deployment type, and 2) a weighted second elevation angle distribution associated with a second wireless deployment type.

9. The method of claim 8 wherein the estimating an elevation angle distribution comprises:
estimating a first elevation angle distribution based on a first set of elevation angle information for a first wireless deployment type;
estimating a second elevation angle distribution based on a second set of elevation angle information for a second wireless deployment type;
determining a first percentage of wireless networks or the user devices for the first wireless deployment type and a second percentage of wireless networks or the user devices for the second wireless deployment type;
weighting the first elevation angle distribution based on the first percentage to obtain a weighted first elevation angle distribution;
weighting the second elevation angle distribution based on the second percentage to obtain a weighted second elevation angle distribution; and
obtaining the overall elevation angle distribution based on the weighted first elevation angle distribution and the weighted second elevation angle distribution.

10. The method of claim 1, wherein the estimating an elevation angle distribution is performed iteratively by updating an uncertainty on an estimate of the elevation angle distribution via a Bayesian technique, and determining or adjusting the set of analog beamforming weights to optimize or maximize beamforming gain or received power.

11. The method of claim 1, wherein the determining, based on the elevation angle distribution, the set of analog beamforming weights is performed to optimize or maximize beamforming gain, average received power, or worst-case received power for the plurality of user devices.

12. The method of claim 1, wherein the estimating the elevation angle distribution is performed iteratively by updating an uncertainty of the estimated elevation angle distribution via a Bayesian technique; and
wherein the determining, based on the elevation angle distribution, the set of analog beamforming weights comprises optimizing and/or re-optimizing the set of analog beamforming weights to be used for the hybrid beamforming such that an average beamforming gain or received power is maximized for the plurality of user devices using the elevation angle distribution.

13. The method of claim 1:
wherein the estimating the elevation angle distribution comprises estimating an uncertainty of the elevation angle distribution using a Bayesian technique; and
wherein the determining the set of analog beamforming weights comprises optimizing or determining an optimum or preferred set of analog beamforming weights based at least in part on the estimated uncertainty of the elevation angle distribution.

14. A non-transitory computer-readable storage medium comprising instructions stored thereon that, when executed by at least one processor, are configured to cause a computing system to perform the method of claim 1.

15. An apparatus comprising:
at least one processor; and
at least one memory including computer program code;

the at least one memory and the computer program code configured to, with the at least one processor, cause the apparatus to:
  obtain elevation angle information for a plurality of user devices, wherein the elevation angle information includes, for each of the plurality of user devices, a best or preferred beam elevation angle used or applied by a network node for communication with the user device;
  estimate an elevation angle distribution for the plurality of user devices based on the elevation angle information;
  determine, based on the elevation angle distribution, a set of analog beamforming weights to be used for hybrid beamforming, wherein each analog beamforming weight of the set of analog beamforming weights is associated with an analog elevation angle; and
  adjust the set of analog beamforming weights based on at least one of a set of pre-tilt angle beamforming weights or an estimated mechanical downtilt angle.

16. The apparatus of claim 15, wherein the computer program code and the at least one processor configured to adjust comprises the computer program code and the at least one processor configured to:
  adjust the set of analog beamforming weights based on at least one of the following to obtain an adjusted set of analog beamforming weights:
    the set of pre-tilt angle beamforming weights to be applied by a plurality of network nodes to provide a pre-tilt angle for wireless transmissions from the plurality of network nodes;
    the estimated mechanical downtilt angle to be applied to antenna systems of the plurality of network nodes;
  wherein the adjusted set of analog beamforming weights are to be used or applied by one or more of the plurality of network nodes to perform analog beamforming as part of the hybrid beamforming for the wireless transmissions.

* * * * *